(12) United States Patent
Oshidari

(10) Patent No.: US 12,331,829 B2
(45) Date of Patent: Jun. 17, 2025

(54) POWER TRANSMISSION DEVICE

(71) Applicant: JATCO Ltd, Fuji (JP)

(72) Inventor: Toshikazu Oshidari, Yokosuka (JP)

(73) Assignee: JATCO LTD, Fuji (JP)

( * ) Notice: Subject to any disclaimer, the term of this patent is extended or adjusted under 35 U.S.C. 154(b) by 174 days.

(21) Appl. No.: 18/042,062

(22) PCT Filed: Sep. 8, 2021

(86) PCT No.: PCT/JP2021/032967
§ 371 (c)(1),
(2) Date: Feb. 17, 2023

(87) PCT Pub. No.: WO2022/074997
PCT Pub. Date: Apr. 14, 2022

(65) Prior Publication Data
US 2023/0313877 A1 Oct. 5, 2023

(30) Foreign Application Priority Data
Oct. 7, 2020 (JP) ................. 2020-169853

(51) Int. Cl.
*F16H 57/04* (2010.01)
*F16H 57/02* (2012.01)
(Continued)

(52) U.S. Cl.
CPC ......... *F16H 57/0476* (2013.01); *F16H 57/02* (2013.01); *F16H 57/0404* (2013.01);
(Continued)

(58) Field of Classification Search
CPC .. F16H 57/0476; F16H 57/02; F16H 57/0404; F16H 57/0436; F16H 57/045; F16H 57/0486; F16H 2057/02034; F16H 2057/02052; F16H 63/3425; F16H 57/0423; F16H 57/0424; F16H 57/043; F16H 57/0441; F16H 57/0457; F16H 57/0471; F16H 57/0479; F16H 57/0483; H02K 7/116; H02K 9/193; H02K 9/26; H02K 5/203; H02K 9/19; B60K 11/02; B60K 2001/006; B60K 1/00; B60K 2001/001; B60Y 2306/03; B60Y 2400/73
See application file for complete search history.

(56) References Cited

U.S. PATENT DOCUMENTS

| 12,140,222 B2 * | 11/2024 | Fujikawa | ............ F16H 57/0476 |
| 12,215,776 B2 * | 2/2025 | Fujikawa | ............... H02K 7/006 |

(Continued)

FOREIGN PATENT DOCUMENTS

| JP | 2008-185078 A | 8/2008 |
| JP | 2009-121549 A | 6/2009 |

(Continued)

*Primary Examiner* — Justin Holmes
(74) *Attorney, Agent, or Firm* — Foley & Lardner LLP

(57) ABSTRACT

A power transmission device includes a motor, a gear mechanism connected downstream of the motor; and a pump that sucks oil through a pump inlet. A shortest distance between an open end of the pump inlet and a surface of a stator of the motor is shorter than a shortest distance between the open end of the pump inlet and a surface of the gear mechanism.

25 Claims, 20 Drawing Sheets

(51) Int. Cl.
*H02K 7/116* (2006.01)
*H02K 9/193* (2006.01)
*H02K 9/26* (2006.01)

(52) U.S. Cl.
CPC ....... *F16H 57/0436* (2013.01); *F16H 57/045* (2013.01); *F16H 57/0486* (2013.01); *H02K 7/116* (2013.01); *H02K 9/193* (2013.01); *H02K 9/26* (2013.01); *F16H 2057/02034* (2013.01); *F16H 2057/02052* (2013.01)

(56) References Cited

U.S. PATENT DOCUMENTS

| | | |
|---|---|---|
| 2009/0127954 A1 | 5/2009 | Mogi et al. |
| 2011/0050014 A1 | 3/2011 | Mogi |
| 2011/0203898 A1* | 8/2011 | Harashima ............. H02K 7/116 475/160 |
| 2013/0119793 A1 | 5/2013 | Hofkirchner et al. |
| 2013/0153338 A1* | 6/2013 | Yamauchi ................ H02K 9/19 184/26 |
| 2013/0192400 A1* | 8/2013 | Dodo .................... F16H 37/082 74/421 A |
| 2020/0282828 A1 | 9/2020 | Suyama et al. |

FOREIGN PATENT DOCUMENTS

| | | |
|---|---|---|
| JP | 2011-158100 A | 8/2011 |
| JP | 2014-207772 A | 10/2014 |
| JP | 2015-107709 A | 6/2015 |
| JP | 2019-152320 A | 9/2019 |
| JP | 2020-085026 A | 6/2020 |
| WO | WO-2019/073821 A1 | 4/2019 |

* cited by examiner

POWER TRANSMISSION DEVICE

The present application claims a priority of Japanese Patent Application No. 2020-169853 filed with the Japan Patent Office on Oct. 7, 2020, all the contents of which are hereby incorporated by reference.

TECHNICAL FIELD

The present invention relates to a power transmission device.

BACKGROUND ART

Patent Literature 1 discloses a structure in which a suction port of a strainer is disposed on an outer peripheral side (an outer side in a radial direction) of a gear mechanism.

CITATION LIST

Patent Literature

Patent Literature 1: JP2019-152320A

SUMMARY OF INVENTION

When a temperature is low, viscosity of an oil may increase, or the oil may become sherbet-like, and a discharge amount of a pump may decrease.

Therefore, there is a need to provide a structure for reducing the decrease in the discharge amount of the pump at a low temperature.

According to an aspect of the present invention, a power transmission device, includes:
a motor;
a gear mechanism connected downstream of the motor; and
a pump that sucks oil through a pump inlet.

A shortest distance between an open end of the pump inlet and a surface of a stator of the motor is shorter than a shortest distance between the open end of the pump inlet and a surface of the gear mechanism.

According to one aspect of the present invention, it is possible to provide a structure for reducing decrease in a discharge amount of a pump at a low temperature.

DESCRIPTION OF EMBODIMENTS

Figure 1:
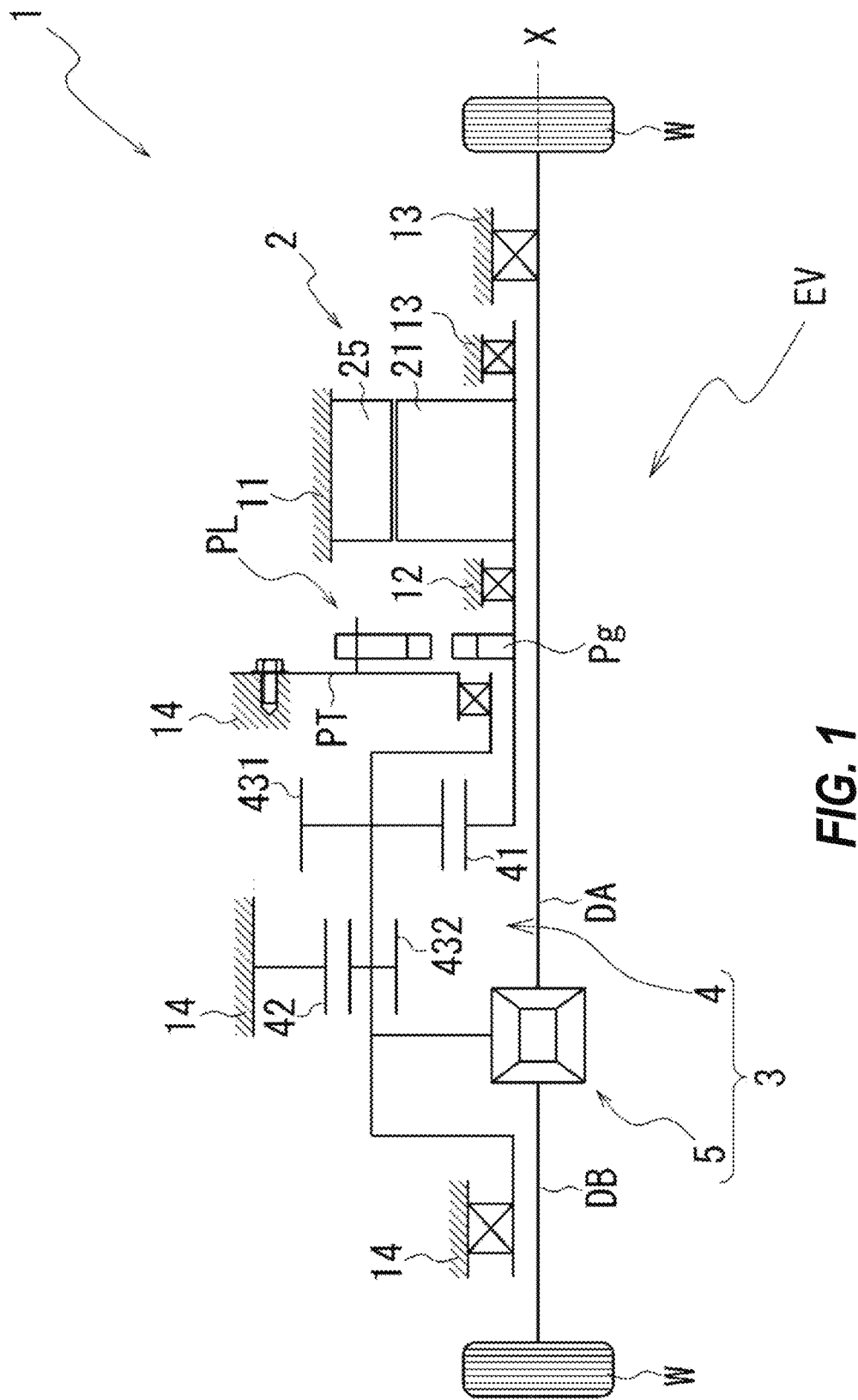
FIG. 1 is a skeleton diagram of a power transmission device.

Hereinafter, a case where an embodiment of the present invention is applied to a power transmission device 1 provided in an electric vehicle EV will be described as an example.

In the following description, when referring to a second element (member, portion, or the like) connected to a first element (member, portion, or the like), a second element (member, portion, or the like) connected downstream of a first element (member, portion, or the like), or a second element (member, portion, or the like) connected upstream of a first element (member, portion, or the like), it is meant that the first element and the second element are connected to each other in a power-transmissible manner. A power input side is upstream, and a power output side is downstream. The first element and the second element may be connected to each other via another element (a clutch, other gear mechanisms, or the like).

"Overlapping when viewed from a predetermined direction" means that a plurality of elements are arranged in a predetermined direction, and has the same meaning as "overlapping in a predetermined direction". The "predetermined direction" is, for example, an axial direction, a radial direction, a gravitational direction, or a vehicle running direction (vehicle forward direction, vehicle rearward direction).

If a drawing shows that a plurality of elements (member, portion, or the like) are arranged in a predetermined direction, it can be considered that in explanation of the description, there is a sentence explaining that the plurality of elements overlap when viewed from the predetermined direction.

"Not overlapping when viewed from a predetermined direction" and "offset when viewed from a predetermined direction" mean that a plurality of elements are not arranged in a predetermined direction, and has the same meaning as "not overlapping in a predetermined direction" and "offset in a predetermined direction". The "predetermined direction" is, for example, an axial direction, a radial direction, a gravitational direction, or a vehicle running direction (vehicle forward direction, vehicle rearward direction).

If a drawing shows that a plurality of elements (member, portion, or the like) are not arranged in a predetermined direction, it can be considered that in explanation of the description, there is a sentence explaining that the plurality of elements do not overlap when viewed from the predetermined direction.

"When viewed from a predetermined direction, a first element (member, portion, or the like) is positioned between a second element (member, portion, or the like) and a third element (member, portion, or the like)" means that the first element can be observed to be between the second element and the third element. The "predetermined direction" is, for example, an axial direction, a radial direction, a gravitational direction, or a vehicle running direction (vehicle forward direction, vehicle rearward direction).

For example, when the second element, the first element, and the third element are arranged in this order along the axial direction, it can be said that the first element is positioned between the second element and the third element when viewed from the radial direction. If a drawing shows that a first element is between a second element and a third element when viewed from a predetermined direction, it can be considered that in explanation of the description, there is a sentence explaining that the first element is between the second element and the third element.

When two elements (member, portion, or the like) overlap when viewed from the axial direction, the two elements are coaxial.

The "axial direction" means an axial direction of a rotation axis of a member that constitutes the power transmission device. The "radial direction" means a direction orthogonal to the rotation axis of the member that constitutes the power transmission device. The member is, for example, a motor, a gear mechanism, or a differential gear mechanism.

FIG. 1 is a skeleton diagram illustrating the power transmission device 1 according to the present embodiment.

Figure 2:
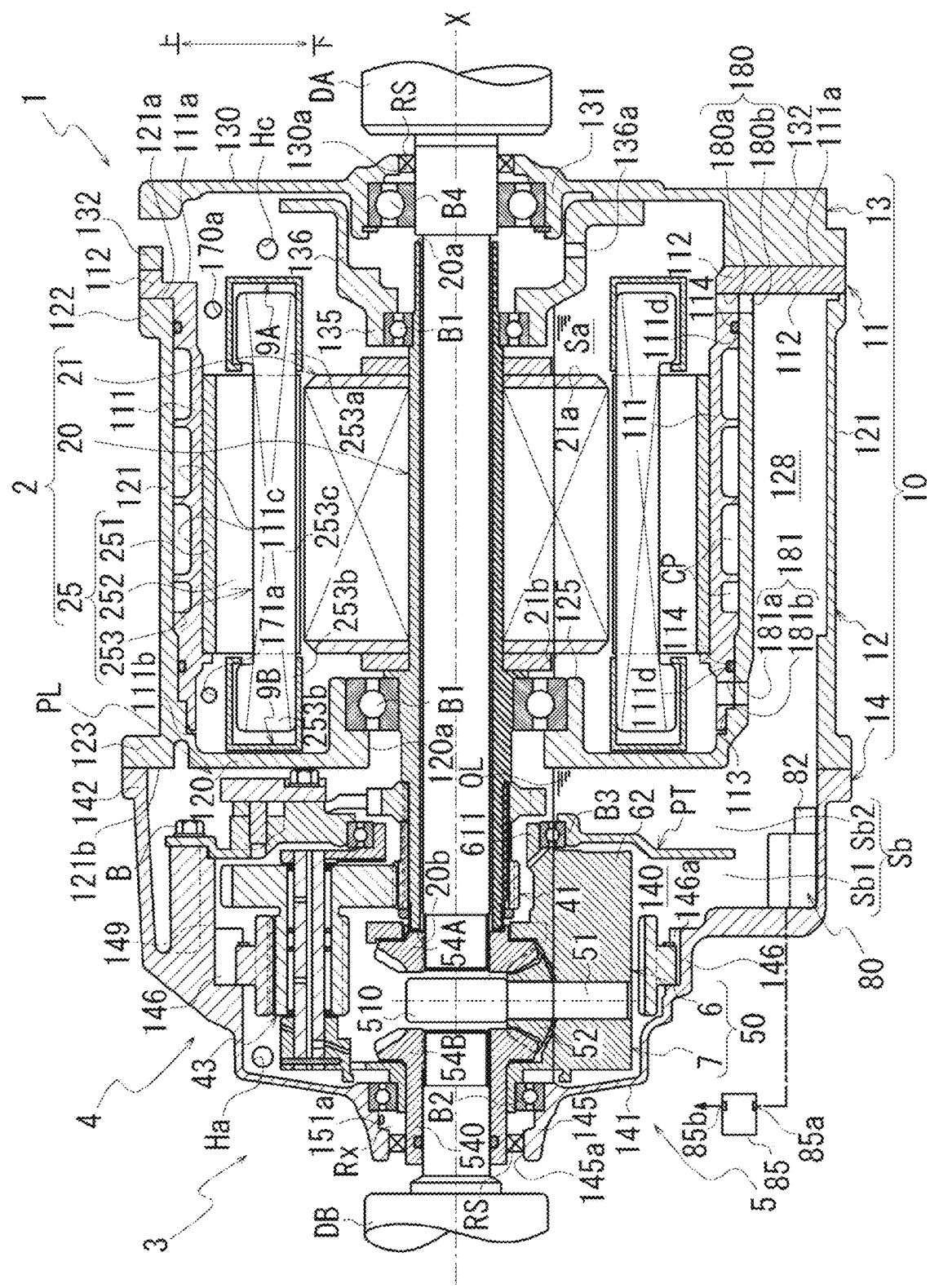
FIG. 2 is a schematic cross-sectional view of the power transmission device.

FIG. 2 is a schematic cross-sectional view illustrating the power transmission device 1 according to the present embodiment.

Figure 3:
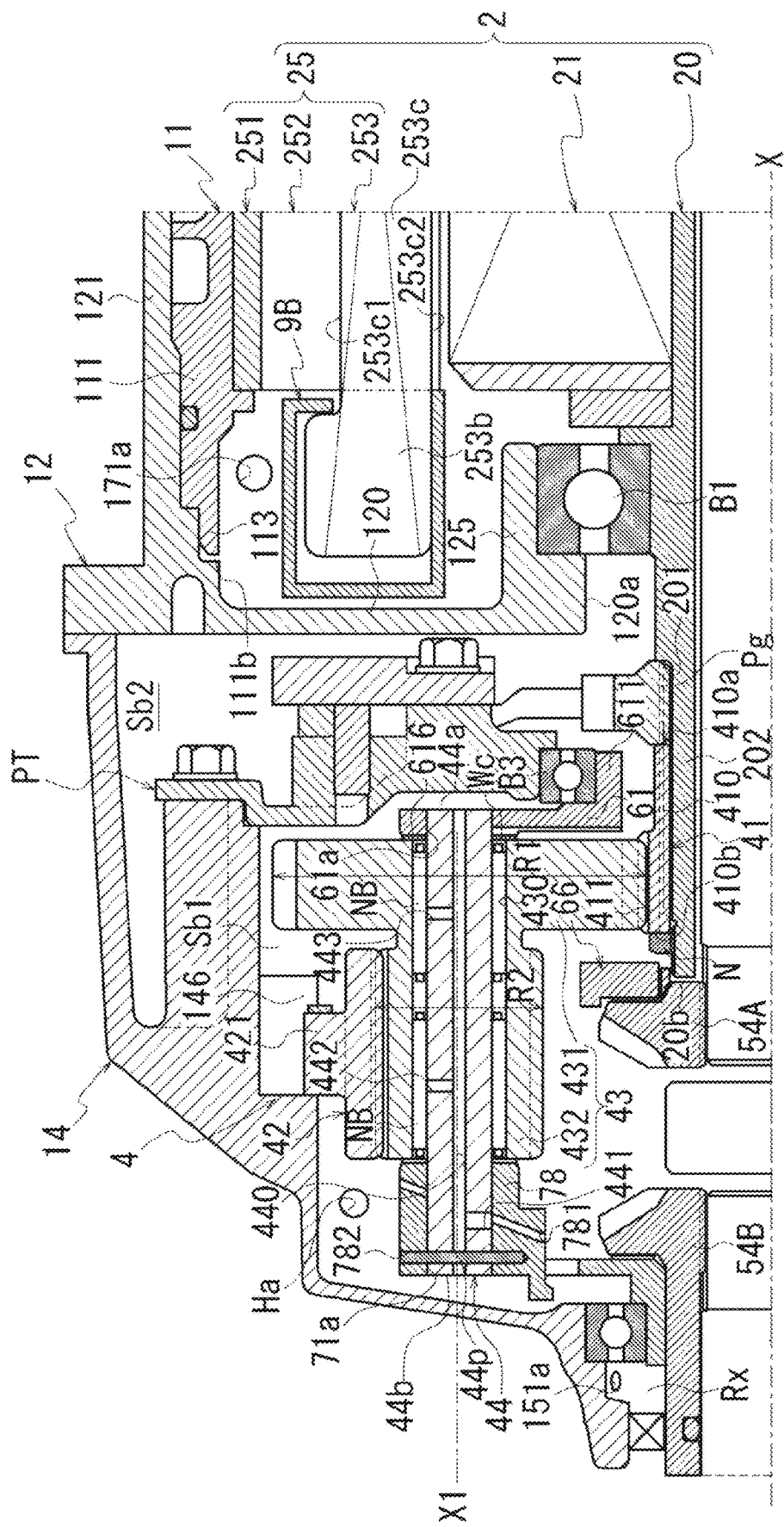
FIG. 3 is an enlarged view around a differential mechanism of the power transmission device.

FIG. 3 is an enlarged view around a planetary reduction gear 4 of the power transmission device 1.

Figure 4:
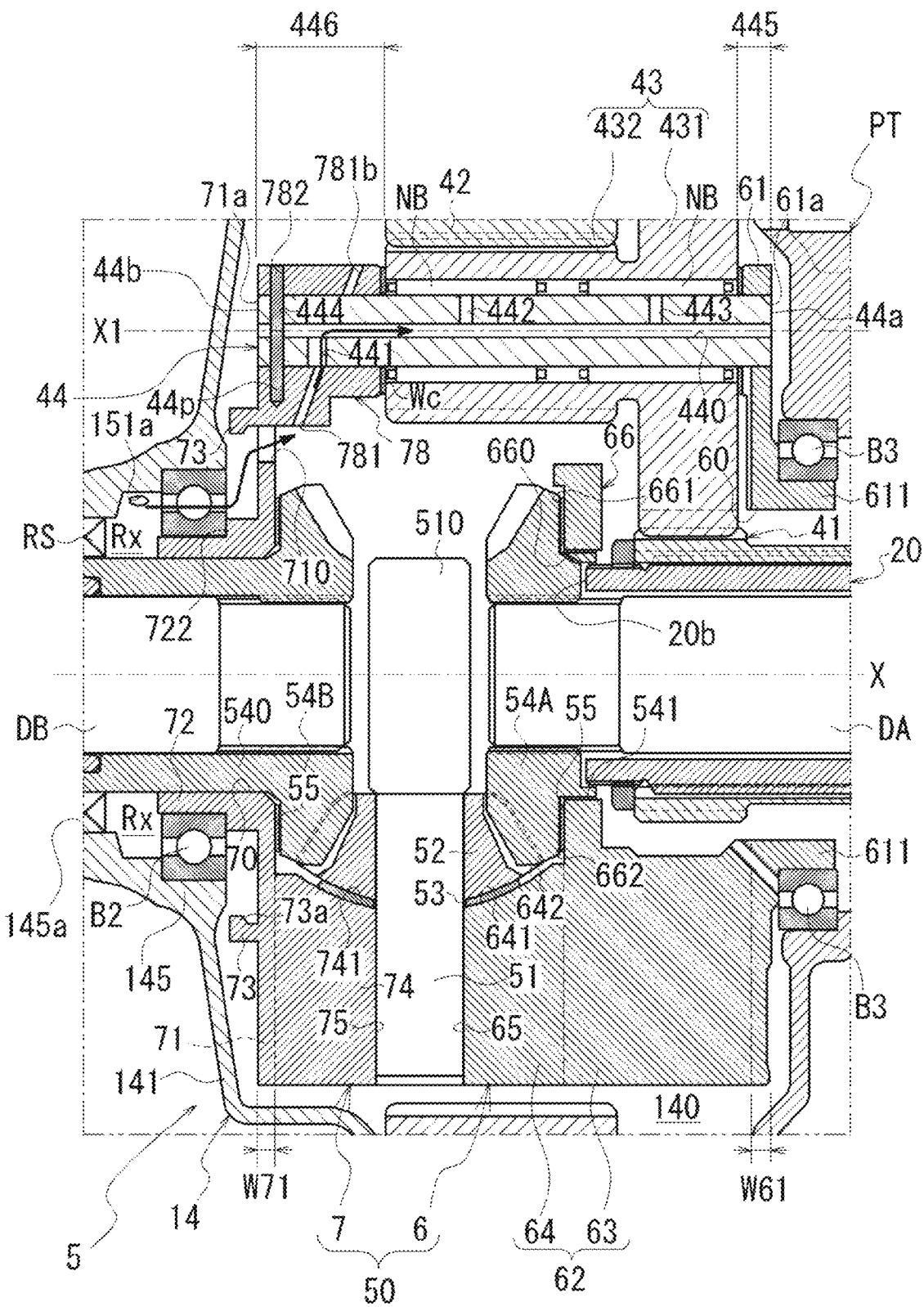
FIG. 4 is an enlarged view around the differential mechanism of the power transmission device.

FIG. 4 is an enlarged view around a differential mechanism 5 of the power transmission device 1.

Note that in the drawings, an up-down direction means up and down sides in a vertical line VL direction with respect to the power transmission device 1 mounted on the electric vehicle EV.

As shown in FIG. 1, the power transmission device 1 includes a motor 2, a gear mechanism 3 that transmits output rotation of the motor 2 to drive shafts DA and DB, and a park lock mechanism PL. Note that the "motor" is a rotating electric machine having an electric motor function and/or a generator function.

In the power transmission device 1, the park lock mechanism PL, the gear mechanism 3, and the drive shafts DA and DB are provided along a transmission path for output rotation around a rotation axis X of the motor 2.

In the power transmission device 1, the output rotation of the motor 2 is transmitted to the drive shafts DA and DB via the gear mechanism 3. In this way, left and right driving wheels W, W are driven.

Here, the gear mechanism 3 includes the planetary reduction gear 4 (reduction mechanism) and the differential mechanism 5 (differential gear). The planetary reduction gear 4 is connected downstream of the motor 2. The differential mechanism 5 is connected downstream of the planetary reduction gear 4. The drive shafts DA and DB are connected downstream of the differential mechanism 5.

The planetary reduction gear 4 decelerates the output rotation of the motor 2 and then inputs the decelerated output rotation to the differential mechanism 5. The differential mechanism 5 transmits the rotation input from the planetary reduction gear 4 to the drive shafts DA and DB.

As shown in FIG. 2, a main body box 10 of the power transmission device 1 includes a first box 11 that accommodates the motor 2 and a second box 12 that is externally inserted into the first box 11. The main body box 10 includes a third box 13 assembled to the first box 11 and a fourth box 14 assembled to the second box 12.

The first box 11 includes a cylindrical support wall portion 111, a flange-like joint portion 112 formed at one end 111a of the support wall portion 111, and a tubular fitting portion 113 formed at the other end 111b of the support wall portion 111.

The first box 11 is disposed with a center line of the support wall portion 111 aligned with the rotation axis X of the motor 2. The motor 2 is accommodated inside the support wall portion 111.

The joint portion 112 protrudes outward in a radial direction of the rotation axis X from the support wall portion 111.

The fitting portion 113 has an outer diameter smaller than that of the support wall portion 111.

The second box 12 includes a cylindrical peripheral wall portion 121, a flange-shaped joint portion 122 provided at one end 121a of the peripheral wall portion 121, and a flange-shaped joint portion 123 provided at the other end 121b of the peripheral wall portion 121.

The peripheral wall portion 121 is formed with an inner diameter that allows the peripheral wall portion 121 to be externally inserted into the support wall portion 111 of the first box 11.

The first box 11 and the second box 12 are assembled to each other such that the peripheral wall portion 121 of the second box 12 is externally inserted into the support wall portion 111 of the first box 11. The fitting portion 113 of the support wall portion 111 of the first box 11 is internally fitted to the peripheral wall portion 121.

The joint portion 122 on the one end 121a side of the peripheral wall portion 121 comes into contact with the joint portion 112 of the first box 11 from the rotation axis X direction. These joint portions 122 and 112 are connected to each other by bolts (not shown).

In the first box 11, a plurality of grooves 111c are provided on an outer periphery of the support wall portion 111. The plurality of grooves 111c are provided at intervals in the rotation axis X direction. The grooves 111c are provided over an entire circumference in a circumferential direction around the rotation axis X.

The peripheral wall portion 121 of the second box 12 is externally inserted into the support wall portion 111 of the first box 11. The peripheral wall portion 121 closes openings of the grooves 111c. A plurality of cooling paths CP through which a coolant flows are formed between the support wall portion 111 and the peripheral wall portion 121. Note that the "coolant" is a refrigerant, and is, for example, liquid (cooling water and the like) and gas (air and the like).

Ring grooves 111d, 111d are formed on both sides of a region in which the grooves 111c are provided on an outer periphery of the support wall portion 111 of the first box 11. Seal rings 114, 114 are attached to the ring grooves 111d, 111d by external fitting.

These seal rings 114 are pressed against an inner periphery of the peripheral wall portion 121 that is externally inserted to the support wall portion 111 to seal a gap between the outer periphery of the support wall portion 111 and the inner periphery of the peripheral wall portion 121.

Oil holes 170a and 171a, which will be described later, are opened on the inner periphery of the support wall portion 111 in an upper region in the up-down direction of the first box 11.

The oil holes 170a and 171a are open on the inner periphery of the support wall portion 111 on the one end 111a side and the other end 111b side in the rotation axis X direction.

A wall portion 120 extending toward an inner diameter side is provided at the other end 121b of the second box 12. The wall portion 120 is provided in a direction orthogonal to the rotation axis X from the peripheral wall portion 121. An opening 120a through which the drive shaft DA is inserted is provided in a region of the wall portion 120 that intersects with the rotation axis X.

In the wall portion 120, a tubular motor support portion 125 surrounding the opening 120a is provided on a surface on the side of the motor 2 (on the right side in the drawing).

The motor support portion 125 is inserted inside a coil end 253b, which will be described later. The motor support portion 125 faces an end portion 21b of a rotor core 21 with a gap in the rotation axis X direction.

In an up-down direction with respect to a mounting state of the power transmission device 1 on the electric vehicle EV, the peripheral wall portion 121 of the second box 12 has a larger thickness in the radial direction of a lower region than that of an upper region.

An oil reservoir portion 128 that penetrates the second box 12 in the rotation axis X direction is formed in the region having a larger thickness in the radial direction.

The oil reservoir portion 128 communicates with an inner space (motor chamber Sa) of the first box 11 via oil passages 180, 181 on the one end 121a side and the other end 121b side of the peripheral wall portion 121 in the rotation axis X direction.

The oil passage 180 includes an oil hole 180a provided on the support wall portion 111 of the first box 11 and an oil hole 180b provided on the peripheral wall portion 121 of the second box 12.

The oil passage 181 includes an oil hole 181a provided on the support wall portion 111 of the first box 11 and an oil hole 181b provided on the peripheral wall portion 121 of the second box 12.

The oil passages 180 and 181 are formed through the support wall portion 111 of the first box 11 and the peripheral wall portion 121 of the second box 12, respectively, in the up-down direction.

The third box 13 includes a wall portion 130 orthogonal to the rotation axis X. A joint portion 132 having a ring shape when viewed from the rotation axis X direction is provided on an outer peripheral portion of the wall portion 130.

As viewed from the first box 11, the third box 13 is positioned on a side opposite to the differential mechanism 5 (on the right side in the drawing). The joint portion 132 of the third box 13 is joined to the joint portion 112 of the first box 11 from the rotation axis X direction. The third box 13 and the first box 11 are connected to each other with bolts (not shown). In this state, the third box 13 closes the opening on the joint portion 122 side (the right side in the drawing) of the support wall portion 111 of the first box 11.

In the third box 13, an insertion hole 130a for the drive shaft DA is provided in a central portion of the wall portion 130.

A lip seal RS is fixed to an inner periphery of the insertion hole 130a. The lip seal RS brings a lip portion (not shown) into elastic contact with an outer periphery of the drive shaft DA. A gap between the inner periphery of the insertion hole 130a and the outer periphery of the drive shaft DA is sealed with the lip seal RS.

A peripheral wall portion 131 surrounding the insertion hole 130a is provided on a surface of the wall portion 130 on the first box 11 side (the left side in the drawing). The drive shaft DA is supported on the inner periphery of the peripheral wall portion 131 via a bearing B4.

A motor support portion 135 is disposed on the motor 2 side (the left side in the drawing) when viewed from the peripheral wall portion 131. The motor support portion 135 has a tubular shape surrounding the rotation axis X with a gap therebetween.

A cylindrical connection wall 136 is connected to an outer periphery of the motor support portion 135. The connection wall 136 is formed with a larger outer diameter than the peripheral wall portion 131 on the wall portion 130 side (the right side in the drawing).

The connection wall 136 is formed integrally with the motor support portion 135. The connection wall 136 is provided along the rotation axis X. The connection wall 136 extends along the rotation axis X in a direction away from the motor 2. A tip side of the connection wall 136 is fixed to the wall portion 130 of the third box 13 with a bolt (not shown).

The motor support portion 135 is supported by the third box 13 via the connection wall 136. One end 20a side of a motor shaft 20 penetrates an inner side of the motor support portion 135 from the motor 2 side to the peripheral wall portion 131 side.

A bearing B1 is supported on an inner periphery of the motor support portion 135. An outer periphery of the motor shaft 20 is supported by the motor support portion 135 via the bearing B1.

A through hole 136a penetrating through the connection wall 136 in a radial direction of the rotation axis X is formed in a lower region of the connection wall 136 in the up-down direction.

An inner space of the connection wall 136 and the motor chamber Sa communicate with each other via the through hole 136a.

The fourth box 14 includes a peripheral wall portion 141 surrounding the outer periphery of the planetary reduction gear 4 and the differential mechanism 5, and a flange-shaped joint portion 142 formed on an end portion of the peripheral wall portion 141 on the second box 12 side.

The fourth box 14 is positioned on the differential mechanism 5 side (the left side in the drawing) when viewed from the second box 12. The joint portion 142 of the fourth box 14 is joined to the joint portion 123 of the second box 12 from the rotation axis X direction. The fourth box 14 and the second box 12 are connected to each other with bolts (not shown).

An interior of the main body box 10 of the power transmission device 1 is partitioned by the wall portion 120 into the motor chamber Sa that accommodates the motor 2 and a gear chamber Sb that accommodates the gear mechanism 3 (the planetary reduction gear 4 and the differential mechanism 5). That is, the wall portion 120 constitutes a partition provided between the gear mechanism 3 and the motor 2.

Specifically, the motor chamber Sa is formed inside the first box 11 between the wall portion 120 of the second box 12 and the wall portion 130 of the third box 13. The motor chamber Sa communicates with the oil reservoir portion 128 via the oil passages 180 and 181 in a lower region in the up-down direction.

The gear chamber Sb is formed between the wall portion 120 of the second box 12 and the peripheral wall portion 141 of the fourth box 14 on an inner diameter side of the fourth box 14. The gear chamber Sb communicates with the oil reservoir portion 128 in the lower region in the up-down direction.

Oil OL is enclosed in the motor chamber Sa and the gear chamber Sb of the main body box 10 (see FIG. 2). The oil OL in the motor chamber Sa cools the motor 2 while being cooled by heat exchange with the coolant flowing through the cooling path CP. Note that the oil OL is made of a material different from that of the coolant. The oil OL in the gear chamber Sb lubricates the gear mechanism 3 and cools the gear mechanism 3. The motor chamber Sa and the gear chamber Sb communicate with each other inside the main body box 10, and oil levels of the oil OL in the motor chamber Sa and the gear chamber Sb are the same.

A plate member PT is disposed inside the gear chamber Sb.

The plate member PT is fixed with bolts B to the fourth box 14.

The plate member PT divides the gear chamber Sb into a first gear chamber Sb1 that accommodates the planetary reduction gear 4 and the differential mechanism 5, and a second gear chamber S$b$2 that accommodates the park lock mechanism PL.

The second gear chamber S$b$2 is positioned between the first gear chamber Sb1 and the motor chamber Sa in the rotation axis X direction.

As shown in FIG. 2, a strainer 80 is disposed inside the gear chamber Sb.

The strainer 80 is fixed to the fourth box 14 by a fixture (not shown) below the plate member PT in the gear chamber Sb. A suction portion 82 of the strainer 80 is provided at a position facing the oil reservoir portion 128 in the rotation axis X direction. The strainer 80 is connected to an oil pump 85 disposed outside the main body box 10. That is, the suction portion 82 constitutes a pump inlet of the oil pump 85.

The motor 2 includes the motor shaft 20, the rotor core 21 (rotor), and a stator core 25 (stator). The motor shaft 20 is cylindrical. The drive shaft DA is disposed passing through the inner periphery of the motor shaft 20. The rotor core 21 is cylindrical and is externally inserted into the motor shaft 20. The stator core 25 is a fixed body positioned outside the rotor core 21 in the radial direction. The stator core 25 surrounds the outer periphery of the rotor core 21 with a gap therebetween.

In the motor shaft 20, the bearings B1 and B1 are externally inserted and fixed to both sides of the rotor core 21, respectively.

The bearing B1 positioned on the one end 20$a$ side (the right side in the drawing) of the motor shaft 20 when viewed from the rotor core 21 is supported on the inner periphery of the motor support portion 135 of the third box 13. The bearing B1 positioned on the other end 20$b$ side is supported on the inner periphery of the cylindrical motor support portion 125 of the second box 12.

The motor support portions 135 and 125 are respectively disposed facing the one end portion 21$a$ and the other end portion 21$b$ of the rotor core 21, with a gap in the rotation axis X direction therebetween, on the inner diameter side of the coil ends 253$a$ and 253$b$, which will be described later.

The rotor core 21 is formed by laminating a plurality of silicon steel plates. Each of the silicon steel plates is externally inserted into the motor shaft 20 in a state where relative rotation thereof with the motor shaft 20 is restricted.

The silicon steel plate has a ring shape when viewed from the rotation axis X direction of the motor shaft 20. N-pole and S-pole magnets (not shown) are provided alternately in a circumferential direction around the rotation axis X on the outer peripheral side of the silicon steel plate.

The stator core 25 surrounding the outer periphery of the rotor core 21 is formed by laminating a plurality of electromagnetic steel plates. The stator core 25 is fixed to the inner periphery of the cylindrical support wall portion 111 of the first box 11.

The stator core 25 includes a yoke portion 251, a teeth portion 252 and a coil 253. The yoke portion 251 is ring-shaped and fixed to the inner periphery of the support wall portion 111. The teeth portion 252 protrudes from the inner periphery of the yoke portion 251 toward the rotor core 21 side. The coil 253 is formed by winding a wire (not shown) over a plurality of the teeth portions 252. A known copper wire or the like can be used as the wire that forms the coil 253. Note that the coil 253 may have a configuration in which the wire is distributedly wound around each of the plurality of teeth portions 252 protruding toward the rotor core 21 side, or may have a configuration in which the wire is concentratedly wound.

As shown in FIG. 2, in the stator core 25, the coil 253 includes a cylindrical base portion 253$c$ surrounding the rotor core 21, and the coil ends 253$a$ and 253$b$ positioned at both end portions of the base portion 253$c$ in the rotation axis X direction, respectively.

A length in the rotation axis X direction of the coil 253 is set to be longer than that of the rotor core 21. The coil ends 253$a$ and 253$b$ of the coil 253 protrude from the rotor core 21 in the rotation axis X direction. The coil ends 253$a$ and 253$b$ have a symmetrical shape with the teeth portions 252 interposed therebetween.

The coil ends 253$a$ and 253$b$ of the stator core 25 are respectively covered with cover members 9A and 9B, which will be described later. The cover members 9A and 9B are made of an insulator such as resin.

As shown in FIG. 3, an outer peripheral surface 253$c$1 of the base portion 253$c$ of the coil 253 faces the yoke portion 251 in the radial direction of the rotation axis X with a gap therebetween. An inner peripheral surface 253$c$2 of the base portion 253$c$ of the coil 253 faces the rotor core 21 in the radial direction of the rotation axis X with a gap therebetween.

As shown in FIG. 2, the wall portion 120 (the motor support portion 125) of the second box 12 is provided with the opening 120$a$. The other end 20$b$ side of the motor shaft 20 passes through the opening 120$a$ to the differential mechanism 5 side (the left side in the drawing) and is positioned inside the fourth box 14.

The other end 20$b$ of the motor shaft 20 faces a side gear 54A, which will be described later, inside the fourth box 14 with a gap in the rotation axis X direction therebetween.

As shown in FIG. 3, the motor shaft 20 is provided with a stepped portion 201 in a region positioned inside the fourth box 14. The stepped portion 201 is positioned near the motor support portion 125.

In the motor shaft 20, a region from the stepped portion 201 to the vicinity of the other end 20b serves as a fitting portion 202 provided with a spline on an outer periphery thereof.

A park gear Pg and a sun gear 41 are spline-fitted to the outer periphery of the fitting portion 202.

One side surface of the park gear Pg in the rotation axis X direction is in contact with the stepped portion 201. One end 410a of a cylindrical base portion 410 of the sun gear 41 is in contact with the other side surface of the park gear Pg in the rotation axis X direction.

A nut N screwed onto the other end 20b of the motor shaft 20 is pressed against the other end 410b of the base portion 410 from the rotation axis X direction.

The sun gear 41 and the park gear Pg are interposed between the nut N and the stepped portion 201 so as not to rotate relative to the motor shaft 20.

The sun gear 41 includes a teeth portion 411 on the outer periphery of the motor shaft 20 on the other end 20b side. A large-diameter gear portion 431 of a stepped pinion gear 43 meshes with an outer periphery of the teeth portion 411.

The stepped pinion gear 43 includes the large-diameter gear portion 431 that meshes with the sun gear 41 and a small-diameter gear portion 432 having a smaller diameter than the large-diameter gear portion 431.

The stepped pinion gear 43 is a gear component in which the large-diameter gear portion 431 and the small-diameter gear portion 432 are arranged in an axis line X1 direction parallel to the rotation axis X and integrally provided.

The large-diameter gear portion 431 is formed with an outer diameter R1 larger than an outer diameter R2 of the small-diameter gear portion 432.

The stepped pinion gear 43 is oriented along the axis line X1. The large-diameter gear portion 431 of the stepped pinion gear 43 is positioned on the motor 2 side (the right side in the drawing).

An outer periphery of the small-diameter gear portion 432 meshes with an inner periphery of a ring gear 42. The ring gear 42 has a ring shape surrounding the rotation axis X with a gap therebetween. A plurality of engaging teeth 421 protruding outward in the radial direction are provided on an outer periphery of the ring gear 42. The plurality of engaging teeth 421 are provided around the rotation axis X in the circumferential direction at intervals.

The engaging teeth 421 provided on the outer periphery of the ring gear 42 are spline-fitted to teeth portions 146a (see FIG. 2) provided on a support wall portion 146 of the fourth box 14. Rotation of the ring gear 42 around the rotation axis X is restricted.

The stepped pinion gear 43 includes a through hole 430 penetrating inner diameter sides of the large-diameter gear portion 431 and the small-diameter gear portion 432 in the axis line X1 direction.

The stepped pinion gear 43 is rotatably supported via needle bearings NB and NB on an outer periphery of a pinion shaft 44 passing through the through hole 430.

The needle bearing NB that supports the inner periphery of the large-diameter gear portion 431 is provided on the outer periphery of the pinion shaft 44.

As shown in FIG. 4, an in-shaft oil passage 440 is provided inside the pinion shaft 44. The in-shaft oil passage 440 penetrates from one end 44a of the pinion shaft 44 to the other end 44b along the axis line Xl.

The pinion shaft 44 is provided with oil holes 442 and 443 that allow the in-shaft oil passage 440 and the outer periphery of the pinion shaft 44 to communicate with each other.

The oil hole 443 opens in a region where the needle bearing NB that supports the inner periphery of the large-diameter gear portion 431 is provided.

The oil hole 442 opens in a region where the needle bearing NB that supports the inner periphery of the small-diameter gear portion 432 is provided.

The oil holes 443 and 442 in the pinion shaft 44 open in a region where the stepped pinion gear 43 is externally inserted.

Furthermore, the pinion shaft 44 is provided with an introduction passage 441 for introducing the oil OL into the in-shaft oil passage 440.

On the outer periphery of the pinion shaft 44, the introduction passage 441 opens in a region positioned inside a support hole 71a of a second case portion 7, which will be described later. The introduction passage 441 allows the in-shaft oil passage 440 and the outer periphery of the pinion shaft 44 to communicate with each other.

An in-case oil passage 781 opens on an inner periphery of the support hole 71a. The in-case oil passage 781 allows an outer periphery of a guide portion 78 protruding from a base portion 71 of the second case portion 7 and the support hole 71a to communicate with each other.

In a cross-sectional view along the axis line X1, the in-case oil passage 781 is inclined with respect to the axis line X1. The in-case oil passage 781 extends toward the rotation axis X side, and is inclined toward a slit 710 provided in the base portion 71.

The oil OL scraped up by a differential case 50, which will be described later, flows into the in-case oil passage 781. The oil OL that moves to the outer diameter side in the radial direction due to a centrifugal force generated by rotation of the differential case 50 flows into the in-case oil passage 781.

The oil OL that flows from the in-case oil passage 781 into the introduction passage 441 flows into the in-shaft oil passage 440 of the pinion shaft 44. The oil OL that flows into the in-shaft oil passage 440 is discharged outward in the radial direction through the oil holes 442 and 443. The oil OL discharged from the oil holes 442 and 443 lubricates the needle bearing NB externally inserted into the pinion shaft 44.

The pinion shaft 44 is provided with a through hole 444 on the other end 44b side with respect to a region where the introduction passage 441 is provided. The through hole 444 penetrates the pinion shaft 44 in a diametrical direction.

The pinion shaft 44 is provided such that the through hole 444 and an insertion hole 782 on the second case portion 7 side, which will be described later, are aligned with each other around the axis line X1 in phase. A positioning pin 44p inserted into the insertion hole 782 passes through the through hole 444 of the pinion shaft 44. As a result, the pinion shaft 44 is supported on the second case portion 7 side while rotation thereof around the axis line X1 is restricted.

As shown in FIG. 4, on the one end 44a side in a longitudinal direction of the pinion shaft 44, a region that protrudes from the stepped pinion gear 43 serves as a first shaft portion 445. The first shaft portion 445 is supported by a support hole 61a provided in a first case portion 6 of the differential case 50.

On the other end 44b side in the longitudinal direction of the pinion shaft 44, a region that protrudes from the stepped pinion gear 43 serves as a second shaft portion 446. The second shaft portion 446 is supported by a support hole 71a provided in a second case portion 7 of the differential case 50.

Here, the first shaft portion 44*a* means a region on the one end 44*a* side of the pinion shaft 44 where the stepped pinion gear 43 is not externally inserted. The second shaft portion 44*b* means a region on the other end 44*b* side of the pinion shaft 44 where the stepped pinion gear 43 is not externally inserted.

A length of the second shaft portion 44*b* of the pinion shaft 44 in the axis line X1 direction is longer than a length of the first shaft portion 44*a* in the axis line X1 direction.

A main configuration of the differential mechanism 5 will be described below.

Figure 5:
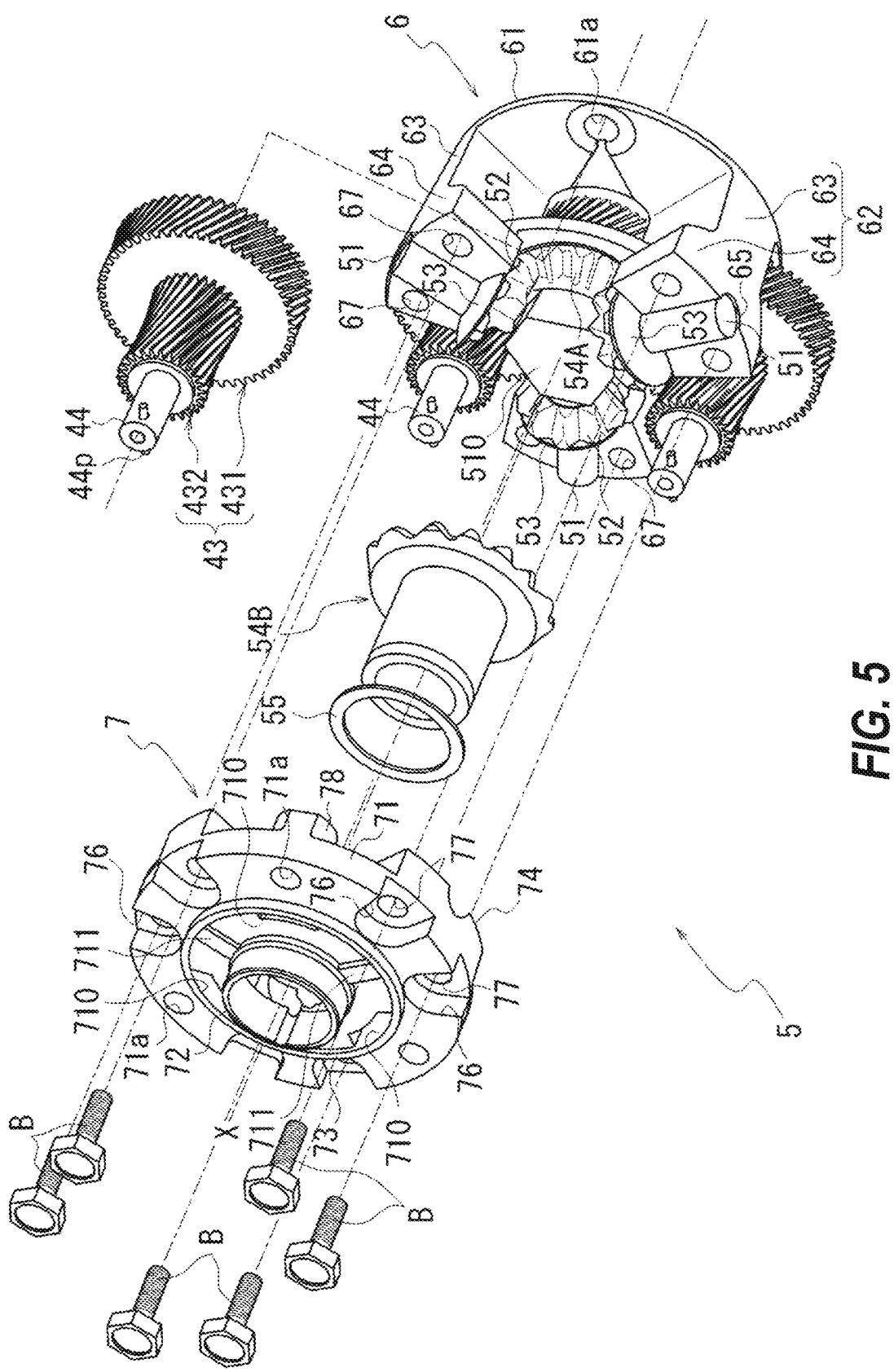
FIG. 5 is an exploded perspective view of the differential mechanism of the power transmission device.

FIG. 5 is an exploded perspective view around the differential case 50 of the differential mechanism 5.

As shown in FIGS. 4 and 5, the differential case 50 of the differential mechanism 5 is formed by assembling the first case portion 6 and the second case portion 7 in the rotation axis X direction. In the present embodiment, the first case portion 6 and the second case portion 7 of the differential case 50 function as carriers that support the pinion shaft 44 of the planetary reduction gear 4.

As shown in FIG. 5, three pinion mate gears 52 and three pinion mate shafts 51 are provided between the first case portion 6 and the second case portion 7 of the differential case 50. The pinion mate shaft 51 functions as a support shaft that supports the pinion mate gear 52.

The pinion mate shafts 51 are provided at equal intervals in the circumferential direction around the rotation axis X.

An end portion on the inner diameter side of each of the pinion mate shafts 51 is connected to a common connecting portion 510.

The pinion mate gears 52 are externally inserted into the pinion mate shafts 51, respectively. Each of the pinion mate gears 52 is in contact with the connecting portion 510 from an outer side of the rotation axis X in the radial direction.

In this state, the pinion mate gears 52 are rotatably supported by the pinion mate shafts 51, respectively.

As shown in FIG. 4, a spherical washer 53 is externally inserted into the pinion mate shaft 51. The spherical washer 53 is in contact with a spherical outer periphery of the pinion mate gear 52.

In the differential case 50, a side gear 54A is positioned on one side of the connecting portion 510 in the rotation axis X direction, and a side gear 54B is positioned on the other side.

The side gear 54A is rotatably supported by the first case portion 6. The side gear 54B is rotatably supported by the second case portion 7.

The side gear 54A meshes with the three pinion mate gears 52 from one side in the rotation axis X direction. The side gear 54B meshes with the three pinion mate gears 52 from the other side in the rotation axis X direction.

As shown in FIG. 5, the first case portion 6 includes a ring-shaped base portion 61.

As shown in FIG. 4, the base portion 61 is a plate-like member having a thickness W61 in the rotation axis X direction.

An opening 60 is provided in a central portion of the base portion 61. A cylindrical wall portion 611 surrounding the opening 60 is provided on a surface of the base portion 61 opposite to the second case portion 7 (the right side in the drawing). An outer periphery of the cylindrical wall portion 611 is supported by the plate member PT via the bearing B3.

As shown in FIG. 5, a surface of the base portion 61 on the second case portion 7 side is provided with three connecting beams 62 extending toward the second case portion 7 side.

The connecting beams 62 are provided at equal intervals in the circumferential direction around the rotation axis X. The connecting beam 62 includes a base portion 63 orthogonal to the base portion 61 and a connecting portion 64 wider than the base portion 63.

As shown in FIG. 4, a support groove 65 for supporting the pinion mate shaft 51 is provided on a tip surface of the connecting portion 64.

An arc portion 641 is formed along an outer periphery of the pinion mate gear 52 on the inner diameter side (the rotation axis X side) of the connecting portion 64.

The arc portion 641 supports the outer periphery of the pinion mate gear 52 via the spherical washer 53.

A gear support portion 66 is connected to a boundary portion between the base portion 63 and the connecting portion 64 of the connecting beam 62. The gear support portion 66 is oriented in a direction orthogonal to the rotation axis X. The gear support portion 66 includes a through hole 660 in a central portion thereof.

The gear support portion 66 is provided with a concave portion 661 surrounding the through hole 660 on a surface opposite to the base portion 61 (the left side in the drawing). The concave portion 661 accommodates a ring-shaped washer 55 that supports a back surface of the side gear 54A.

A cylindrical wall portion 541 is provided on the back surface of the side gear 54A. The washer 55 is externally inserted into the cylindrical wall portion 541.

As shown in FIG. 5, a support hole 61*a* for the pinion shaft 44 is opened in the base portion 61. The support hole 61*a* opens in a region between the connecting beams 62 and 62 which are spaced apart in the circumferential direction around the rotation axis X. As shown in FIG. 3, the base portion 61 is provided with a boss portion 616 surrounding the support hole 61*a*. A washer We externally inserted into the pinion shaft 44 is in contact with the boss portion 616 from the rotation axis X direction.

As shown in FIG. 5, bolt holes 67 and 67 are provided on both sides of the support groove 65 in the connecting portion 64, respectively.

A connecting portion 74 on the second case portion 7 side is joined to the connecting portion 64 of the first case portion 6 from the rotation axis X direction. The first case portion 6 and the second case portion 7 are joined to each other by screwing bolts B penetrating through a connecting portion on the second case portion 7 side into the bolt holes 67 and 67.

As shown in FIG. 5, the second case portion 7 includes a ring-shaped base portion 71.

As shown in FIG. 4, the base portion 71 is a plate-like member having a thickness W71 in the rotation axis X direction.

A through hole 70 penetrating through the base portion 71 in a thickness direction is provided in a central portion of the base portion 71.

A cylindrical wall portion 72 surrounding the through hole 70 and a peripheral wall portion 73 surrounding the cylindrical wall portion 72 with a gap therebetween are provided on a surface of the base portion 71 opposite to the first case portion 6 (the left side in the drawing).

A protruding portion 73*a* protruding toward the rotation axis X is provided at a tip of the peripheral wall portion 73. The protruding portion 73*a* is provided over the entire circumference around the rotation axis X in the circumferential direction.

Three support holes 71*a* for the pinion shaft 44 are opened on an outer diameter side of the peripheral wall portion 73.

The support holes 71a are provided at intervals in the circumferential direction around the rotation axis X.

Three slits 710 that penetrate the base portion 71 in the thickness direction are provided on an inner diameter side of the peripheral wall portion 73.

As shown in FIG. 5, the slit 710 has an arcuate shape along an inner periphery of the peripheral wall portion 73 when viewed from the rotation axis X direction. The slit 710 is formed in a predetermined angular range in the circumferential direction around the rotation axis X.

As shown in FIG. 5, the slits 710 are provided in the second case portion 7 at intervals in the circumferential direction around the rotation axis X. Each of the slits 710 is provided across the inner diameter side of the support hole 71a in the circumferential direction around the rotation axis X.

Between the slits 710 and 710 adjacent to each other in the circumferential direction around the rotation axis X, a protruding wall 711 protruding toward a front side of paper surface is provided. The protruding wall 711 extends linearly in the radial direction of the rotation axis X. The protruding wall 711 is provided straddling the peripheral wall portion 73 on the outer diameter side and the cylindrical wall portion 72 on the inner diameter side.

The three protruding walls 711 are provided at intervals in the circumferential direction around the rotation axis X. The protruding walls 711 are provided with a phase shift of approximately 45 degrees in the circumferential direction around the rotation axis X with respect to the slits 710.

On an outer diameter side of the peripheral wall portion 73, between the support holes 71a and 71a adjacent to each other in the circumferential direction around the rotation axis X, bolt accommodating portions 76 and 76 recessed toward a back side of paper surface are provided. An insertion hole 77 for a bolt is opened inside the bolt accommodating portion 76. The insertion hole 77 penetrates the base portion 71 in the thickness direction (the rotation axis X direction).

Connecting portions 74 protruding toward the first case portion 6 are provided on a surface of the base portion 71 on the first case portion 6 side (the right side in the drawing).

The connecting portions 74 are provided in the same number as the connecting beams 62 on the first case portion 6 side.

As shown in FIG. 4, a support groove 75 for supporting the pinion mate shaft 51 is provided on a tip surface of the connecting portion 74.

An arc portion 741 along the outer periphery of the pinion mate gear 52 is provided on the inner diameter side (the rotation axis X side) of the connecting portion 74.

The arc portion 741 supports the outer periphery of the pinion mate gear 52 via the spherical washer 53.

In the second case portion 7, a ring-shaped washer 55 that supports a back surface of the side gear 54B is placed on a surface of the base portion 71 on the first case portion 6 side. A cylindrical wall portion 540 is provided on the back surface of the side gear 54B. The washer 55 is externally inserted into the cylindrical wall portion 540.

Guide portions 78 are provided on the base portion 71 of the second case portion 7. The guide portions 78 protrude toward the first case portion 6 side (the right side in the drawing). The guide portions 78 are provided in the same number as boss portions 616 of the first case portion 6.

As shown in FIG. 4, the pinion shaft 44 is inserted into the support hole 71a of the guide portion 78 from the first case portion 6 side in a cross-sectional view along the axis line X1. The pinion shaft 44 is positioned such that rotation thereof around the axis line X1 is restricted by the positioning pin 44p.

In this state, the small-diameter gear portion 432 of the stepped pinion gear 43 externally inserted into the pinion shaft 44 is in contact with the guide portion 78 from the axis line X1 direction with the washer We interposed therebetween.

In the differential case 50, a bearing B2 is externally inserted into the cylindrical wall portion 72 of the second case portion 7. The bearing B2 externally inserted into the cylindrical wall portion 72 is held by a support portion 145 of the fourth box 14. The cylindrical wall portion 72 of the differential case 50 is rotatably supported by the fourth box 14 via the bearing B2.

The drive shaft DB passing through an opening portion 145a of the fourth box 14 is inserted into the support portion 145 from the rotation axis X direction. The drive shaft DB is rotatably supported by the support portion 145.

The lip seal RS is fixed to an inner periphery of the opening portion 145a. A lip portion (not shown) of the lip seal RS is in elastic contact with an outer periphery of the cylindrical wall portion 540 of the side gear 54B externally inserted into the drive shaft DB.

As a result, a gap between an outer periphery of the cylindrical wall portion 540 of the side gear 54B and an inner periphery of the opening portion 145a is sealed.

The first case portion 6 of the differential case 50 is supported by the plate member PT via a bearing B3 externally inserted into the cylindrical wall portion 611.

As shown in FIG. 2, the drive shaft DA passing through the insertion hole 130a of the third box 13 is inserted into the first case portion 6 from the rotation axis X direction. The drive shaft DA is provided across the inner diameter side of the motor shaft 20 of the motor 2 and the sun gear 41 of the planetary reduction gear 4 in the rotation axis X direction.

As shown in FIG. 4, inside the differential case 50, the side gears 54A and 54B are spline-fitted to an outer periphery of a tip portion of the drive shafts DA and DB. The side gears 54A, 54B and the drive shafts DA, DB are connected to each other in a manner of rotating together around the rotation axis X.

In this state, the side gears 54A and 54B are arranged opposite to each other with a gap therebetween in the rotation axis X direction. A connecting portion 510 of the pinion mate shaft 51 is positioned between the side gears 54A and 54B.

As shown in FIG. 5, in the present embodiment, a total of three pinion mate shafts 51 extend outward in the radial direction from connecting portion 510. The pinion mate gears 52 are supported by the pinion mate shafts 51, respectively. The pinion mate gears 52 are assembled to the side gear 54A positioned on one side in the rotation axis X direction and the side gear 54B positioned on the other side in such a manner that the teeth portions thereof are meshed with each other.

As shown in FIG. 2, the oil OL for lubricating is stored inside the fourth box 14. A lower portion of the differential case 50 is positioned within the stored oil OL.

In the present embodiment, the oil OL is stored up to a height where the connecting beam 62 is positioned within the oil OL when the connecting beam 62 is positioned at the lowest position.

The stored oil OL is scraped up by the differential case 50 rotating around the rotation axis X when the output rotation of the motor 2 is transmitted.

FIGS. 6 to 11 are diagrams illustrating an oil catch portion 15.

Figure 6:
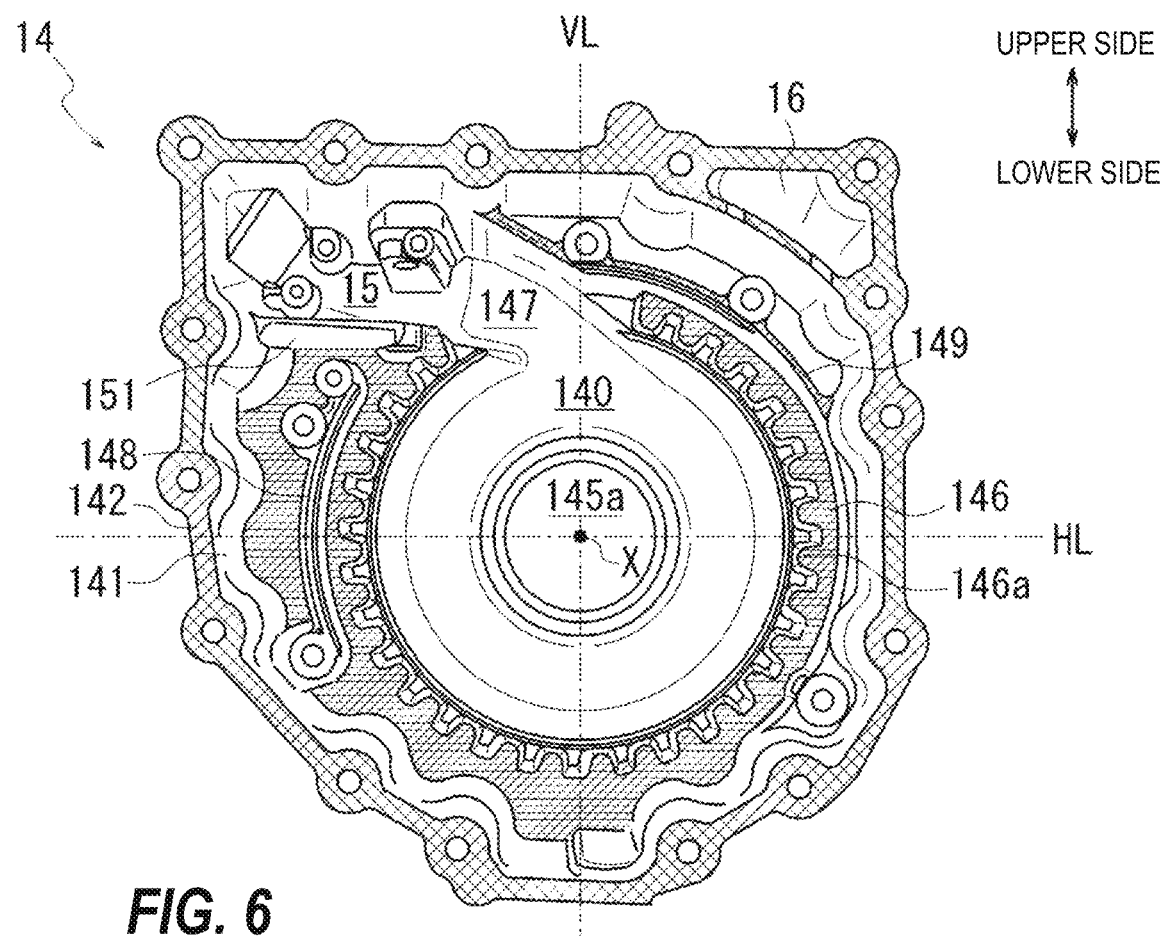
FIG. 6 is a diagram illustrating an oil catch portion.

FIG. 6 is a plan view of the fourth box 14 viewed from the third box 13 side.

Figure 7:
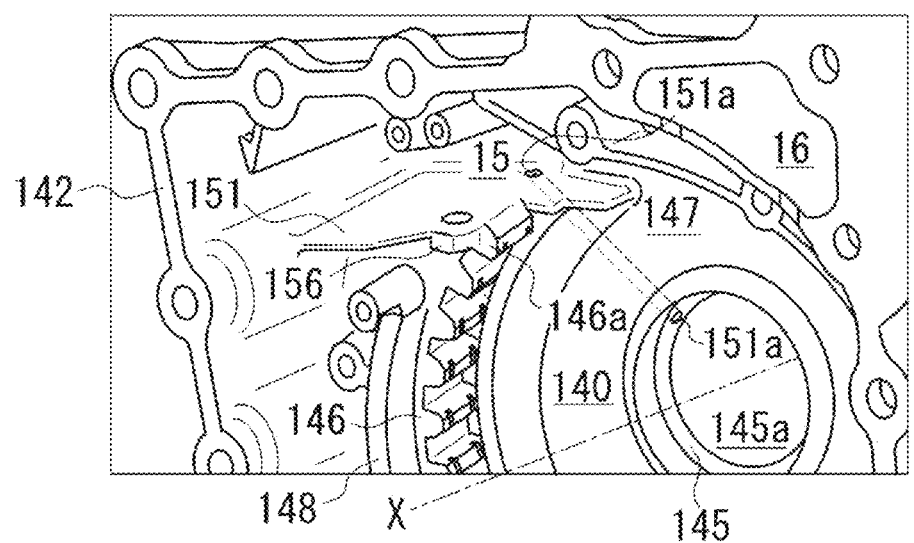
FIG. 7 is a diagram illustrating the oil catch portion.

FIG. 7 is a perspective view of the oil catch portion 15 shown in FIG. 6 as viewed obliquely from above.

Figure 8:
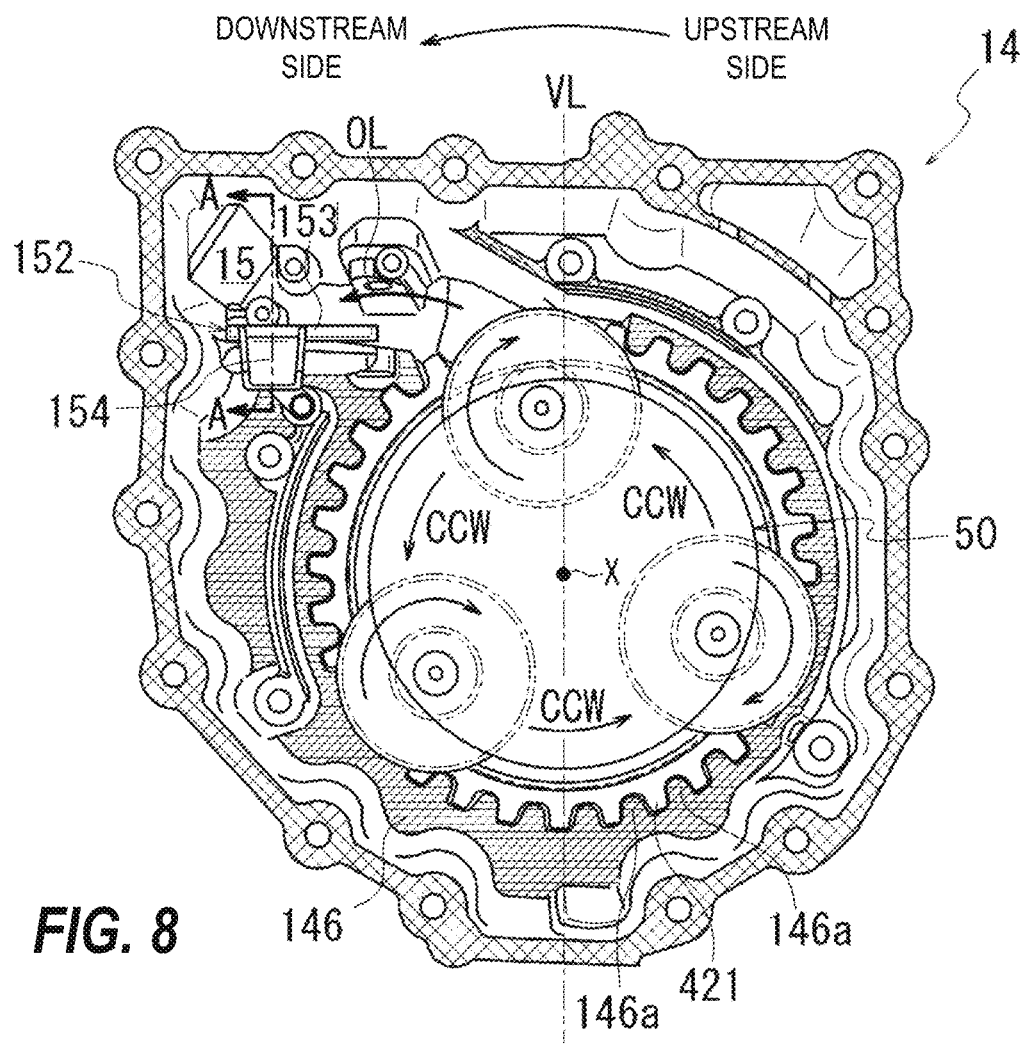
FIG. 8 is a diagram illustrating the oil catch portion.

FIG. 8 is a plan view of the fourth box 14 viewed from the third box 13 side. FIG. 8 shows a state in which the differential case 50 is disposed.

Figure 9:
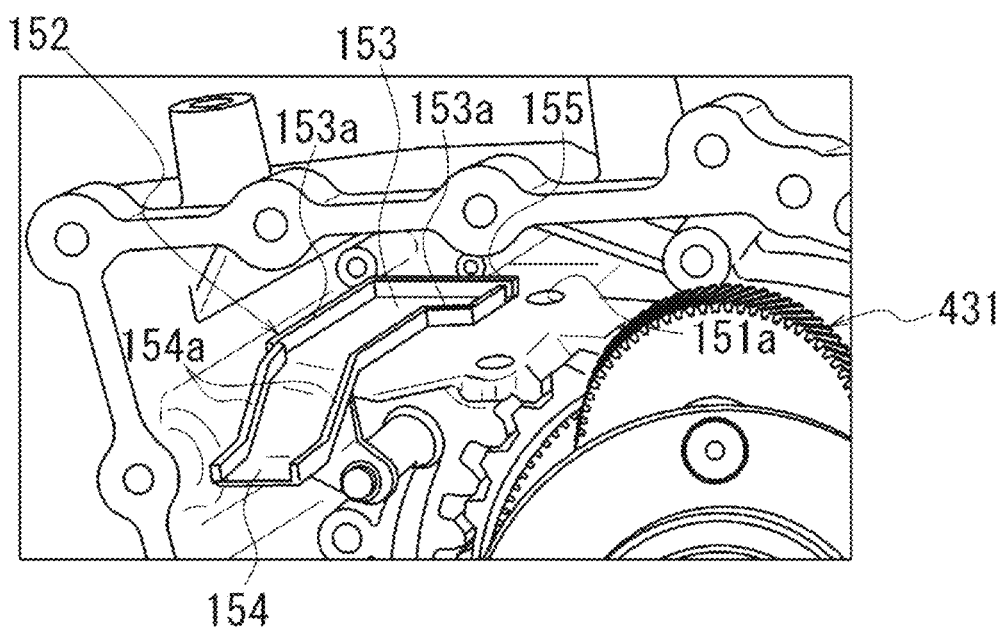
FIG. 9 is a diagram illustrating the oil catch portion.

FIG. 9 is a perspective view of the oil catch portion 15 shown in FIG. 8 as viewed obliquely from above.

Figure 10:
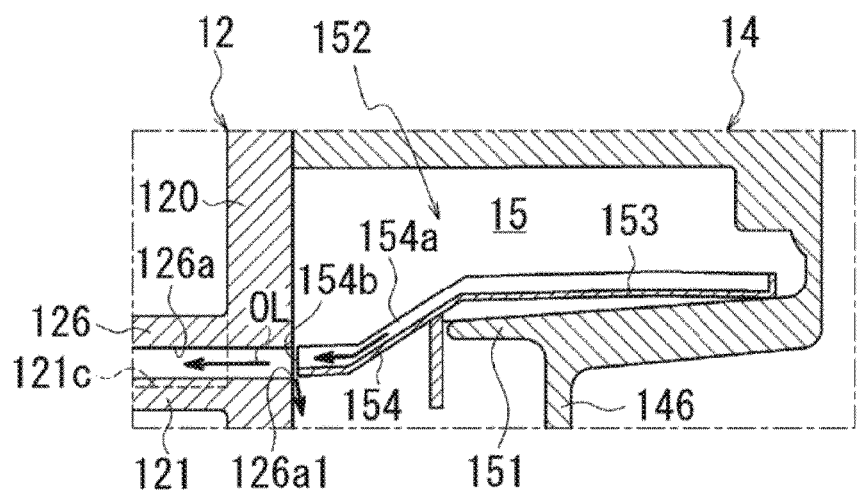
FIG. 10 is a diagram illustrating the oil catch portion.

FIG. 10 is a schematic diagram of an A-A cross section in FIG. 8.

Figure 11:
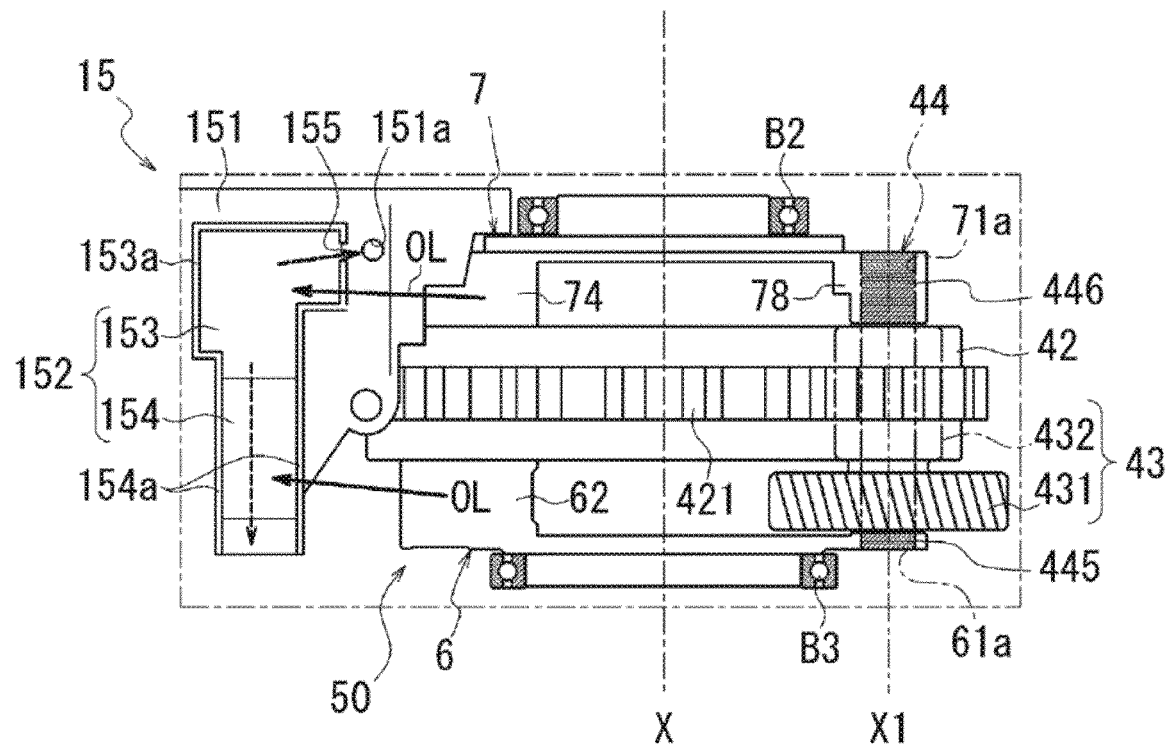
FIG. 11 is a diagram illustrating the oil catch portion.

FIG. 11 is a schematic diagram illustrating a positional relation between the oil catch portion 15 and the differential case 50 (the first case portion 6 and the second case portion 7) when the power transmission device 1 is viewed from above.

Note that in FIGS. 6 and 8, hatching is added to clarify the positions of the joint portion 142 of the fourth box 14 and the support wall portion 146.

As shown in FIG. 6, the fourth box 14 is provided with the support wall portion 146 surrounding the central opening portion 145a with a gap therebetween when viewed from the rotation axis X direction. The inner side (rotation axis X) of the support wall portion 146 serves as an accommodation portion 140 of the differential case 50.

A space for the oil catch portion 15 and a space for a breather chamber 16 are formed in an upper portion of the fourth box 14.

A support wall portion 146 of the fourth box 14 is provided with a communication port 147 that allows the oil catch portion 15 and the accommodation portion 140 of the differential case 50 to communicate with each other in a region that intersects with the vertical line VL.

The oil catch portion 15 and the breather chamber 16 are respectively positioned on one side (the left side in the drawing) and the other side (the right side in the drawing) interposing the vertical line VL orthogonal to the rotation axis X.

The oil catch portion 15 is disposed at a position offset from the vertical line VL passing through a rotation center (rotation axis X) of the differential case 50. When the oil catch portion 15 is viewed from above, the oil catch portion 15 is disposed at a position offset from right above the differential case 50.

Here, the vertical line VL is a vertical line VL based on a state of the power transmission device 1 mounted on the electric vehicle EV. The vertical line VL is orthogonal to the rotation axis X when viewed from the rotation axis X direction.

Note that a horizontal line HL in the following explanation is a horizontal line HL based on a state of the power transmission device 1 mounted on the electric vehicle EV. The horizontal line HL is orthogonal to the rotation axis X when viewed from the rotation axis X direction.

As shown in FIG. 7, the oil catch portion 15 is formed extending further to the back side of the paper surface than the support wall portion 146. A support base portion 151 (shelf portion) is provided at a lower edge of the oil catch portion 15 while protruding toward the front side of the paper surface. The support base portion 151 is provided in a range from the support wall portion 146 to the front side of the paper surface and from the joint portion 142 of the fourth box 14 to the back side of the paper surface.

As shown in FIG. 6, a communication port 147 is provided on the vertical line VL side of the oil catch portion 15 (the right side in the drawing) when viewed from the rotation axis X direction. The communication port 147 allows the oil catch portion 15 and the accommodation portion 140 of the differential case 50 to communicate with each other. The communication port 147 is formed by cutting out a part of the support wall portion 146. The communication port 147 is provided in a range that crosses the vertical line VL from the breather chamber 16 side (the right side in the drawing) to the oil catch portion 15 side (left side in the drawing) when viewed from the rotation axis X direction.

As shown in FIG. 8, in the present embodiment, when the electric vehicle EV equipped with the power transmission device 1 travels forward, the differential case 50 rotates in a counterclockwise direction CCW around the rotation axis X as viewed from the third box 13 side.

Therefore, the oil catch portion 15 is positioned downstream of the differential case 50 in a rotational direction. A circumferential width of the communication port 147 is wider on a left side of the vertical line VL than that on a right side. The left side of the vertical line VL is a downstream side in a rotational direction of the differential case 50, and the right side thereof is an upstream side. As a result, most of the oil OL scraped up by the differential case 50 rotating around the rotation axis X can flow into the oil catch portion 15.

Furthermore, as shown in FIG. 11, an outer peripheral position of a rotation track of the second shaft portion 446 of the pinion shaft 44 and an outer peripheral position of a rotation track of the large-diameter gear portion 431 are offset with each other in the radial direction of the rotation axis X. The outer peripheral position of the rotation track of the second shaft portion 446 is positioned on the inner diameter side of the outer peripheral position of the rotation track of the large-diameter gear portion 431.

Therefore, the second shaft portion 446 has a spatial margin on the outer diameter side thereof. The oil catch portion 15 is provided using this space, and a space inside the main body box 10 can be effectively used.

As shown in FIG. 11, the second shaft portion 446 protrudes inward of the small-diameter gear portion 432 when viewed from the motor 2. A peripheral member of the second shaft portion 446 (for example, the guide portion 78 of the differential case 50 that supports the second shaft portion 446) is positioned close to the oil catch portion 15.

As a result, the oil OL (lubricating oil) can be smoothly supplied from the peripheral member to the oil catch portion 15.

As shown in FIG. 7, an end portion of the oil hole 151a on an outer diameter side is open inward of the support base portion 151. The oil hole 151a extends inside the fourth box 14 to an inner diameter side. An end portion on the inner diameter side of the oil hole 151a opens to an inner periphery of the support portion 145.

As shown in FIG. 4, the end portion on the inner diameter side of the oil hole 151a in the support portion 145 opens between the lip seal RS and the bearing B2.

As shown in FIGS. 9 and 11, an oil guide 152 is mounted on the support base portion 151.

The oil guide 152 includes a catch portion 153 and a guide portion 154 extending from the catch portion 153 to the first box 11 side (the front side of the paper surface in FIG. 9).

As shown in FIG. 11, when viewed from above, the support base portion 151 is provided at a position on an outer side in the radial direction of the rotation axis X and overlapping a part of the differential case 50 (the first case portion 6 and the second case portion 7), so that interference with the stepped pinion gear 43 (large-diameter gear portion 431) can be avoided.

The catch portion 153 is provided at a position overlapping the second shaft portion 446 of the pinion shaft 44 when viewed from the radial direction of the rotation axis X. Furthermore, the guide portion 154 is provided at a position overlapping the first shaft portion 445 of the pinion shaft 44 and the large-diameter gear portion 431.

Therefore, when the differential case 50 rotates around the rotation axis X, a part of the oil OL that is scraped up by the differential case 50 moves toward the catch portion 153 and the guide portion 154.

A wall portion 153a extending in a direction away from the support base portion 151 (upward) is provided on an outer peripheral edge of the catch portion 153. A part of the oil OL that is scraped up by the differential case 50 that rotates around the rotation axis X is reserved in the oil guide 152.

A notch portion 155 is provided on the wall portion 153a inward of the catch portion 153 (the back side of the paper surface of FIG. 9).

The notch portion 155 is provided in a region facing the oil hole 151a. A part of the oil OL reserved in the catch portion 153 is discharged from the notch portion 155 toward the oil hole 151a.

The guide portion 154 extends toward the second box 12 side (a lower side in FIG. 11) at a position avoiding interference with the differential case 50.

Wall portions 154a and 154a are provided on both sides of the guide portion 154 in a width direction. The wall portions 154a and 154a are provided over an entire length of the guide portion 154 in the longitudinal direction. The wall portions 154a and 154a are connected to the wall portion 153a surrounding an outer periphery of the catch portion 153.

A part of the oil OL reserved in the catch portion 153 also flows to the guide portion 154 side.

As shown in FIG. 10, the guide portion 154 is inclined downward and away from the catch portion 153. A tip 154b of the guide portion 154 is provided with a gap from the wall portion 120 of the second box 12.

In the wall portion 120, one end 126a1 of the oil passage 126a is opened at a position on which the guide portion 154 extends. The oil passage 126a is provided within a rib 126 provided on an outer periphery 121c of the peripheral wall portion 121.

The tip 154b of the guide portion 154 and one end 126a1 of the oil passage 126a are opposed to each other with a gap therebetween in the rotation axis X direction (a left-right direction in FIG. 10).

Therefore, a part of the oil OL that is scraped up by the differential case 50 and then flows down the guide portion 154 by its own weight flows into the oil passage 126a, and the remaining part thereof flows downward along an inner periphery of the wall portion 120.

Figure 12:
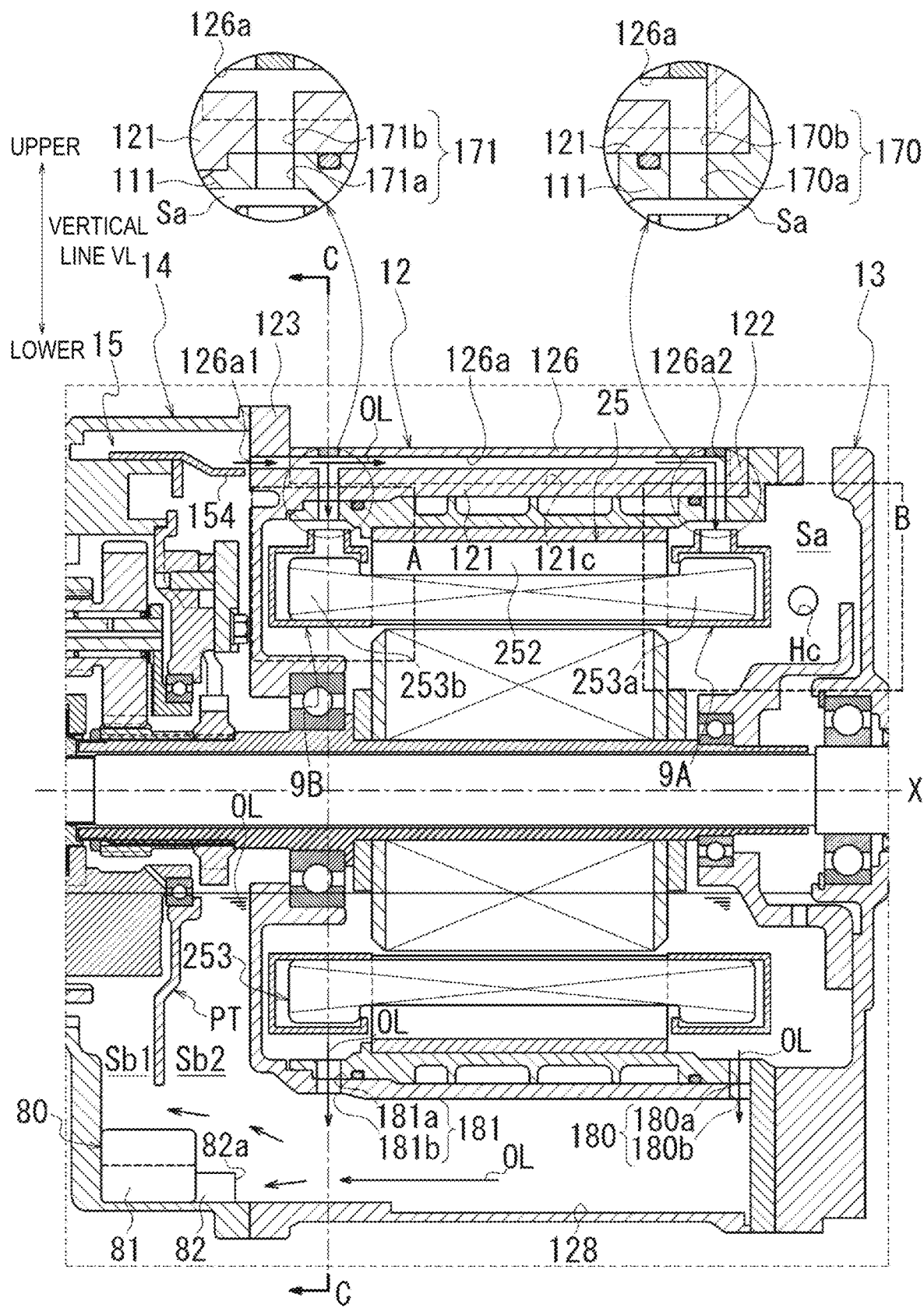
FIG. 12 is a diagram illustrating flow of oil around a motor.

FIG. 12 is a diagram illustrating flow of the oil OL around the motor 2. In FIG. 12, a cross section different from that in FIG. 2 is shown.

Figure 13:
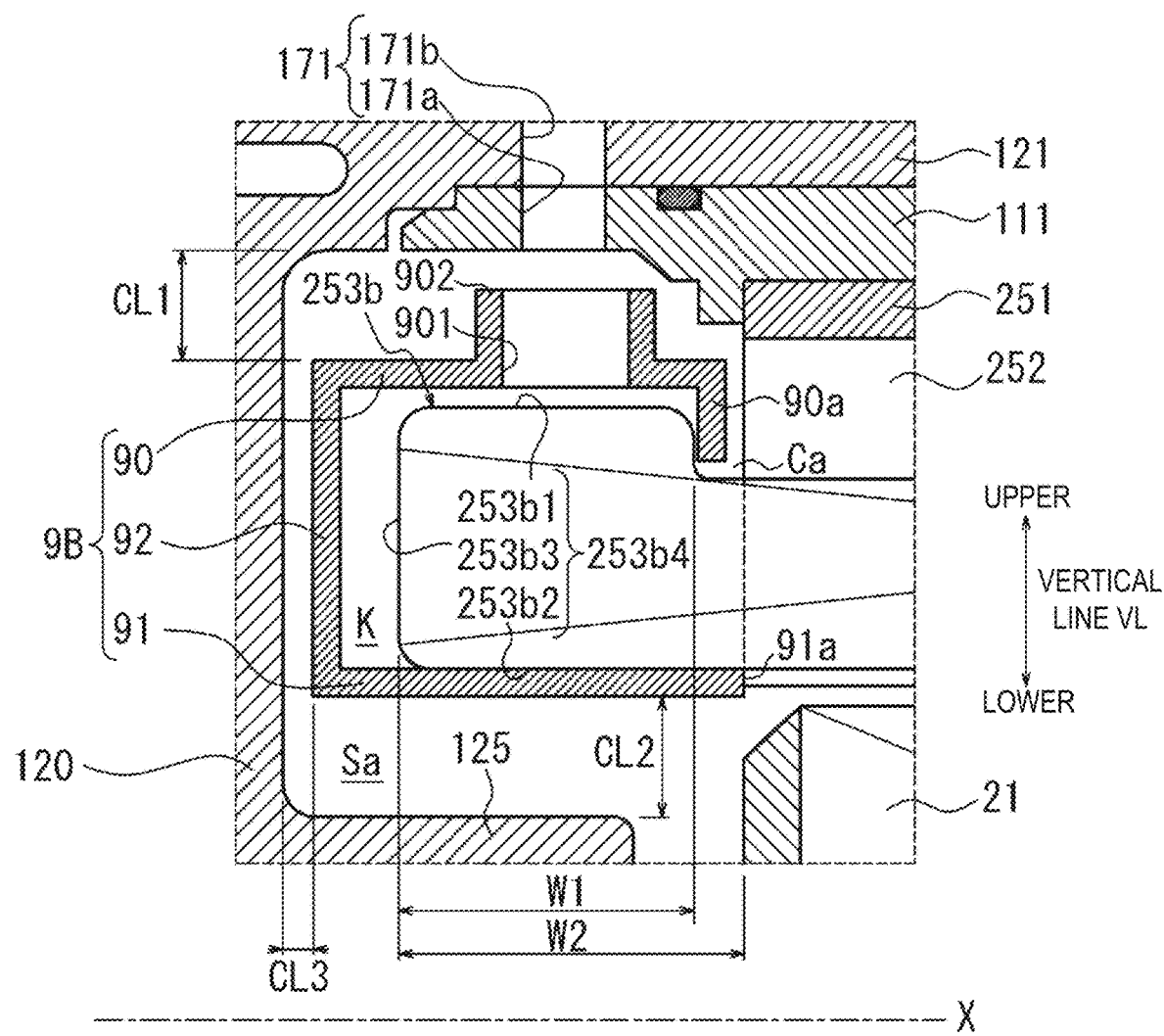
FIG. 13 is an enlarged view of a main part of a cover member.

FIG. 13 is a diagram illustrating the cover member 9B. FIG. 13 is an enlarged view of a region A in FIG. 12.

Figure 14:
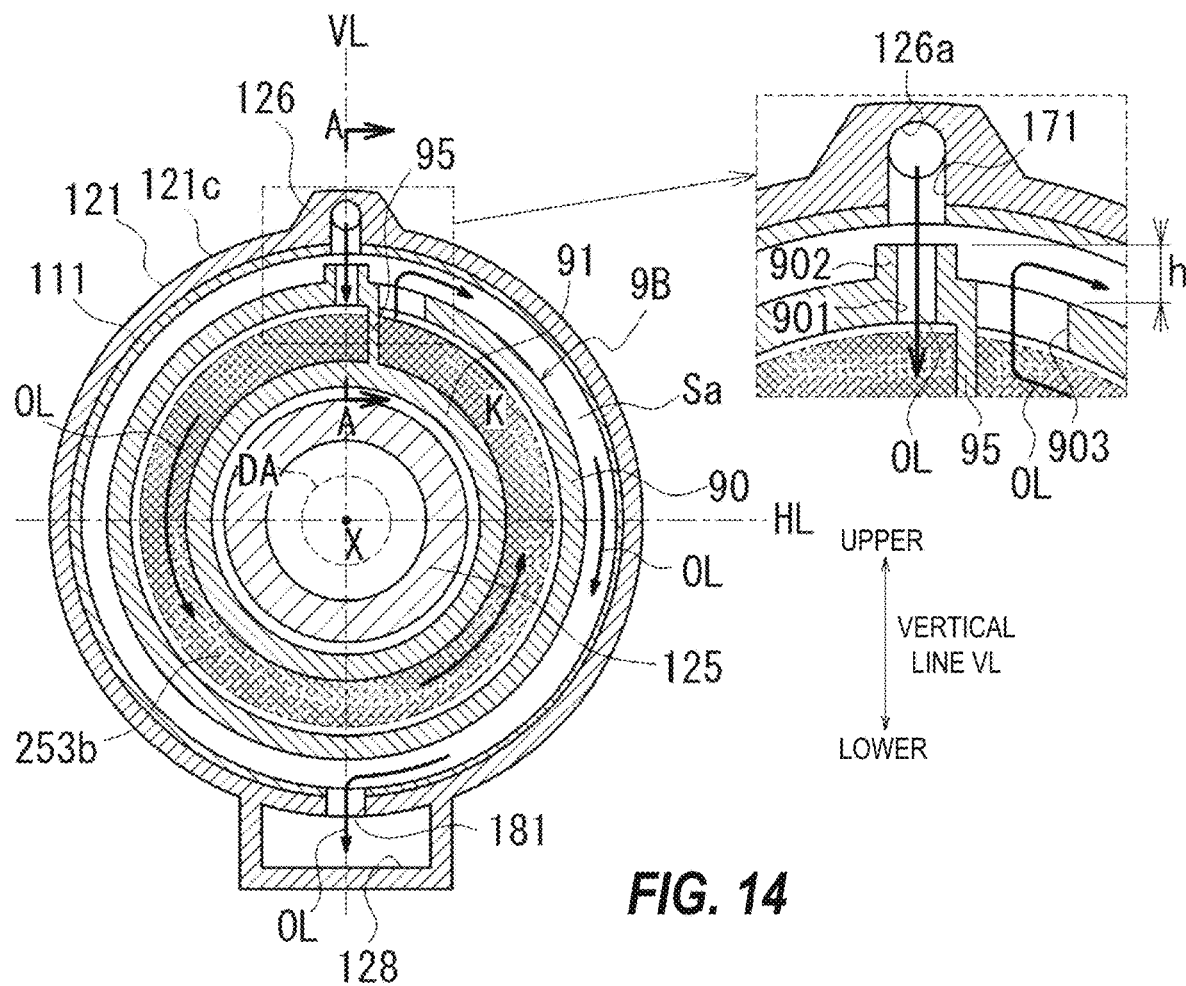
FIG. 14 is a diagram illustrating flow of oil around a coil end.

FIG. 14 is a diagram illustrating flow of the oil OL around the coil end 253b. FIG. 14 is a schematic diagram of a C-C cross section in FIG. 12.

Figure 15:
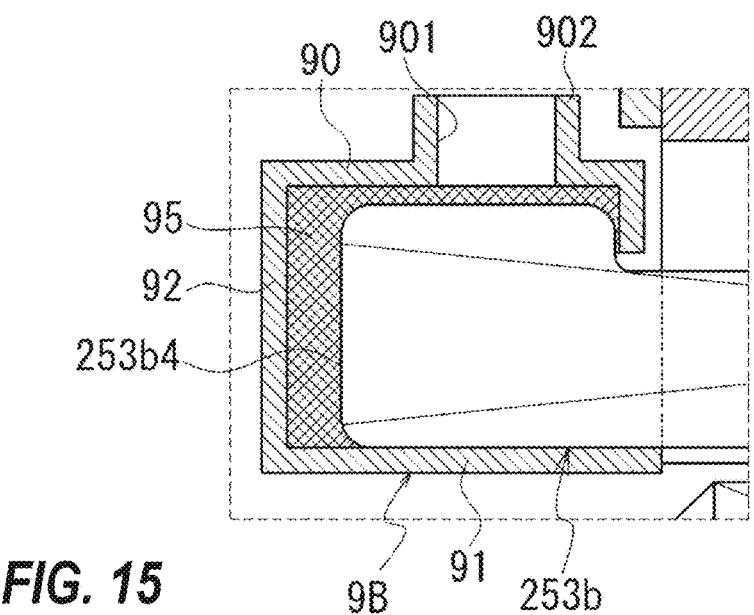
FIG. 15 is a diagram illustrating a partition wall.

FIG. 15 is a diagram illustrating the partition wall 95 of the cover member 9B. FIG. 15 is a schematic diagram of an A-A cross section in FIG. 14.

Note that in FIG. 14, a size of the cover member 9B is exaggerated. In FIG. 14, a region in which the coil end 253b in an accommodation chamber K is disposed is indicated by cross-hatching and virtual lines. In FIG. 14, the drive shaft DA is indicated by a dashed line. In FIG. 15, in order to make a position of the partition wall 95 easier to understand, the partition wall 95 is cross-hatched.

As described above, the oil passages 126a into which the oil OL flows is formed in the rib 126 of the second box 12 (see FIG. 10). The rib 126 bulges outward from the outer periphery 121c of the peripheral wall portion 121 of the second box 12 and surrounds the oil passage 126a.

As shown in FIG. 12, the rib 126 is formed extending from the joint portion 123 on the other end side of the second box 12 to the joint portion 122 on the one end side.

One end 126a1 in the longitudinal direction of the oil passage 126a inside the rib 126 opens to an end surface of the joint portion 123. The oil passage 126a extends to the vicinity of joint portion 122. The oil hole 170b extending to the inner diameter side communicates with the other end 126a2 of the oil passage 126a.

The oil hole 170b opens at a position facing the oil hole 170a of the support wall portion 111. In the present embodiment, the oil hole 170b on the peripheral wall portion 121 side and the oil hole 170a on the support wall portion 111 side constitute the oil passage 170 that allows the oil passage 126a and the motor chamber Sa to communicate with each other.

The oil hole 171b extending to the inner diameter side communicates with the one end 126a1 of the oil passage 126a.

The oil hole 171b opens at a position facing the oil hole 171a of the support wall portion 111. In the present embodiment, the oil hole 171b on the peripheral wall portion 121 side and the oil hole 171a on the support wall portion 111 side constitute the oil passage 171 that allows the oil passage 126a and the motor chamber Sa to communicate with each other.

In the present embodiment, a part of the oil OL that is scraped up by the rotation of the differential case 50 reaches the oil catch portion 15. A part of the oil OL in the oil catch portion 15 is discharged from the guide portion 154 to the oil passage 126a, and then supplied to the motor chamber Sa through the oil passages 170 and 171.

As shown in FIG. 12, the coil end 253a and the cover member 9A enclosing the coil end 253a are positioned below the oil passage 170 in the vertical line VL direction.

The coil end 253b and the cover member 9B enclosing the coil end 253b are positioned below the oil passage 171 in the vertical line VL direction.

Here, the coil ends 253a and 253b according to the present embodiment and the cover members 9A and 9B enclosing these coil ends 253a and 253b are symmetrical with each other with the teeth portion 252 of the motor 2 interposed therebetween.

As shown in FIG. 14, the cover member 9B has a ring shape surrounding the rotation axis X. The cover member 9B is provided surrounding the region where the coil end 253b is provided.

As shown in FIG. 13, the coil end 253b includes an outer peripheral surface 253b1 and an inner peripheral surface 253b2 that are oriented along the rotation axis X, and an end surface 253b3 that is oriented along the radial direction of the rotation axis X. Hereinafter, the outer peripheral surface 253b1, the inner peripheral surface 253b2, and the end surface 253b3 are collectively referred to as a surface 253b4.

The outer peripheral surface 253b1 of the coil end 253b has a width W1 in the rotation axis X direction (the left-right direction in the drawing) smaller than a width W2 of the inner peripheral surface 253b2 (W1<W2). Therefore, a gap Ca in the rotation axis X direction is formed between the teeth portion 252 and the outer diameter side (the outer peripheral surface 253b1) of the coil end 253b.

As shown in FIG. 13, the cover member 9B includes an outer peripheral wall 90, an inner peripheral wall 91, and a connection wall 92. The outer peripheral wall 90 has a tubular shape surrounding the outer peripheral surface 253b1 of the coil end 253b with a gap therebetween. The inner peripheral wall 91 has a tubular shape that can be internally inserted into the inner peripheral surface 253b2 of the coil end 253b. The connection wall 92 faces the end surface 253b3 of the coil end 253b with a gap therebetween in the rotation axis X direction.

The connection wall 92 overlaps the coil end 253b and the wall portion 120 in the rotation axis X direction. The connection wall 92 is disposed substantially parallel to the end surface 253b3 of the coil end 253b, and connects end portions of the outer peripheral wall 90 and the inner peripheral wall 91 to each other.

The outer peripheral wall 90 overlaps the coil end 253b and the support wall portion 111 in the radial direction of the rotation axis X. A locking portion 90a extending to the inner diameter side is provided at a tip of the outer peripheral wall 90. The locking portion 90a is formed by bending the tip side of the outer peripheral wall 90 toward the inner diameter side. The locking portion 90a is inserted into the gap Ca between the coil end 253b and the teeth portion 252.

The inner peripheral wall 91 overlaps the coil end 253b and the motor support portion 125 in the radial direction of the rotation axis X. The inner peripheral wall 91 is provided crossing between the outer periphery of the rotor core 21 and the coil end 253b of the stator core 25 in the radial direction of the rotation axis X of the motor 2.

The cover member 9B is mounted on the coil end 253b such that the tip 91a of the inner peripheral wall 91 is brought into contact with the teeth portion 252 from the rotation axis X direction, and the locking portion 90a is locked to a side surface of the coil end 253b on the teeth portion 252 side.

When the cover member 9B is mounted to the coil end 253b, the coil end 253b is accommodated in the space K surrounded by the outer peripheral wall 90, the inner peripheral wall 91, and the connection wall 92 of the cover member 9B. In this state, a gap through which the oil OL can flow is formed between a lateral side and an upper side of the coil end 253b and the cover member 9B. The space K will also be referred to as the accommodation chamber K hereinafter. That is, the accommodation chamber K of the cover member 9B accommodates the coil end 253b, which is at least a part of the stator core 25.

Here, the accommodation chamber K is a space separated from the rotor core 21 of the motor 2 within the motor chamber Sa. The accommodation chamber K is a space separated from the gear chamber Sb in which the gear mechanism 3 is positioned. Note that the separated space means a space isolated from other spaces by walls. The accommodation chamber K constitutes a space isolated from the rotor core 21 and the gear chamber Sb by the outer peripheral wall 90, the inner peripheral wall 91, and the connection wall 92.

As shown in FIG. 14, when viewed from the rotation axis X direction, the accommodation chamber K formed inside the cover member 9B has a substantially annular shape surrounding the rotation axis X with a gap. Note that in FIG. 14, the region in which the coil end 253b in the accommodation chamber K is disposed is indicated by cross-hatching and virtual lines.

As shown in FIG. 13, when the cover member 9B is mounted on the coil end 253b, the accommodation chamber K is formed separately from the motor chamber Sa inside the first box 11. A volume of the accommodation chamber K is smaller than a volume of the motor chamber Sa.

Here, as shown in FIG. 13, a gap CL1 is formed between the outer peripheral wall 90 of the cover member 9B and the support wall portion 111 of the first box 11 in the radial direction of the rotation axis X.

A gap CL2 is formed between the inner peripheral wall 91 of the cover member 9B and the motor support portion 125 of the second box 12 in the radial direction of the rotation axis X. A gap CL3 is formed between the connection wall 92 of the cover member 9B and the wall portion 120 of the second box 12 in the rotation axis X direction.

As shown in FIG. 13, the outer peripheral wall 90 of the cover member 9B is formed with a through hole 901 penetrating through the outer peripheral wall 90 and a cylindrical wall portion 902 surrounding the through hole 901.

The through hole 901 is provided in the outer peripheral wall 90 when viewed from the radial direction of the rotation axis X overlapping the coil end 253b. The cylindrical wall portion 902 surrounding the through hole 901 protrudes upward in the vertical line VL direction.

As shown in FIG. 14, the through hole 901 and the cylindrical wall portion 902 are formed above the horizontal line HL passing through the rotation axis X.

As shown in FIG. 13, in the outer peripheral wall 90, the through hole 901 is provided at a position facing the oil hole 171a with a gap therebetween in the vertical line VL direction when the cover member 9B is mounted on the coil end 253b.

In the present embodiment, the cylindrical wall portion 902 surrounding the through hole 901 is formed with an outer diameter larger than an inner diameter of the oil hole 171a. Therefore, the cylindrical wall portion 902 is provided with a gap in the vertical line VL direction between the cylindrical wall portion 902 and the support wall portion 111 in which the oil hole 171a opens.

Note that the cylindrical wall portion 902 may be formed with an outer diameter smaller than the inner diameter of the oil hole 171a. In this case, the cylindrical wall portion 902 may be disposed in a state of being inserted into the oil hole 171a.

As shown in FIG. 14, the through hole 901 is provided at the highest position in the vertical line VL direction in the outer peripheral wall 90 of the cover member 9B when viewed from the rotation axis X direction.

In FIG. 14, the vertical line VL is a straight line orthogonal to the rotation axis X, and the through hole 901 penetrates the outer peripheral wall 90 in the vertical line VL direction at a position concentric with the vertical line VL.

A through hole 903 that penetrates the outer peripheral wall 90 in the vertical line VL direction is formed at a position adjacent to the through hole 901 when viewed from the rotation axis X direction.

The through hole 903 is offset in the circumferential direction around the rotation axis X with respect to the through hole 901 when viewed from the rotation axis X direction. The through hole 903 is positioned above the horizontal line HL passing through the rotation axis X together with the through hole 901. Here, "adjacent" means a state in which the through hole 903 is disposed near the through hole 901.

As shown in FIG. 14, the through holes 901 and 903 respectively communicate with the accommodation chamber K inside the cover member 9B and the motor chamber Sa outside.

The oil passage 171 opens above the through hole 901. Therefore, the oil OL discharged from the oil passage 171 flows into the accommodation chamber K inside the cover member 9B through the through hole 901.

A partition wall 95 is provided inside the accommodation chamber K between the through holes 901 and 903 adjacent to each other in the circumferential direction around the rotation axis X. The partition wall 95 constitutes a partition portion that partitions the internal space of the accommodation chamber K. The partition wall 95 is also positioned above the horizontal line HL passing through the rotation axis X.

In the accommodation chamber K, a flow path for the oil OL that makes a full circle in the circumferential direction around the rotation axis X is formed from one end where the through hole 901 opens to the other end where the through hole 903 opens by the partition wall 95.

The through hole 901 is an inlet for the oil OL to the formed flow path, and the through hole 903 is an outlet for the oil OL.

As shown in FIG. 15, when the coil end 253*b* is wrapped by the cover member 9B, the partition wall 95 is provided to close the gap between the outer peripheral wall 90, the inner peripheral wall 91, and the connection wall 92 of the cover member 9B and a surface 235*b*4 of the coil end 253*b*.

Note that the partition wall 95 may be formed in advance in a shape following an outer shape of the coil end 253*b* before being wrapped by the cover member 9B. The accommodation chamber K is filled with a liquid sealing material before the partition wall 95 is wrapped by the cover member 9B. In wrapping the coil end 253*b* with the cover member 9B, the sealing material may be deformed so as to follow the outer shape of the coil end 253*b*. Any sealing material may be used as long as it has a property of being solidified after a predetermined period of time elapses.

Figure 16:
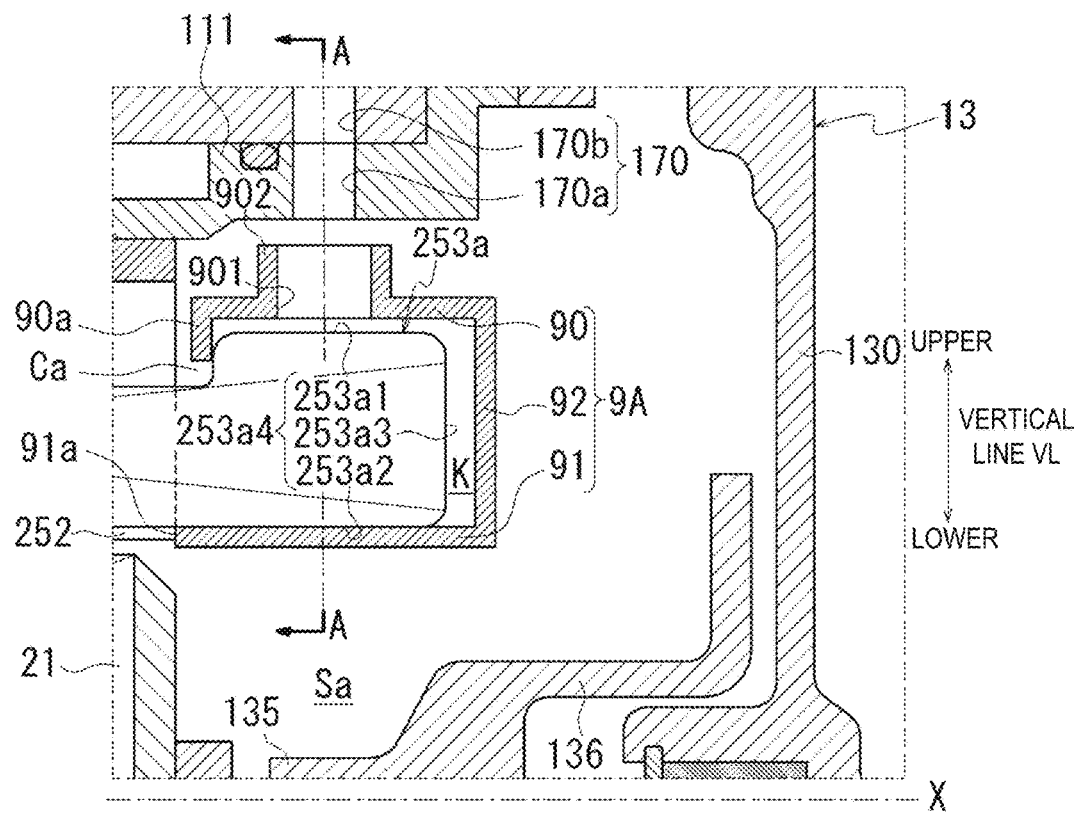
FIG. 16 is an enlarged view of a main part of the cover member.

FIG. 16 is a diagram illustrating the cover member 9A. FIG. 16 is an enlarged view of a region B in FIG. 12.

Figure 17:
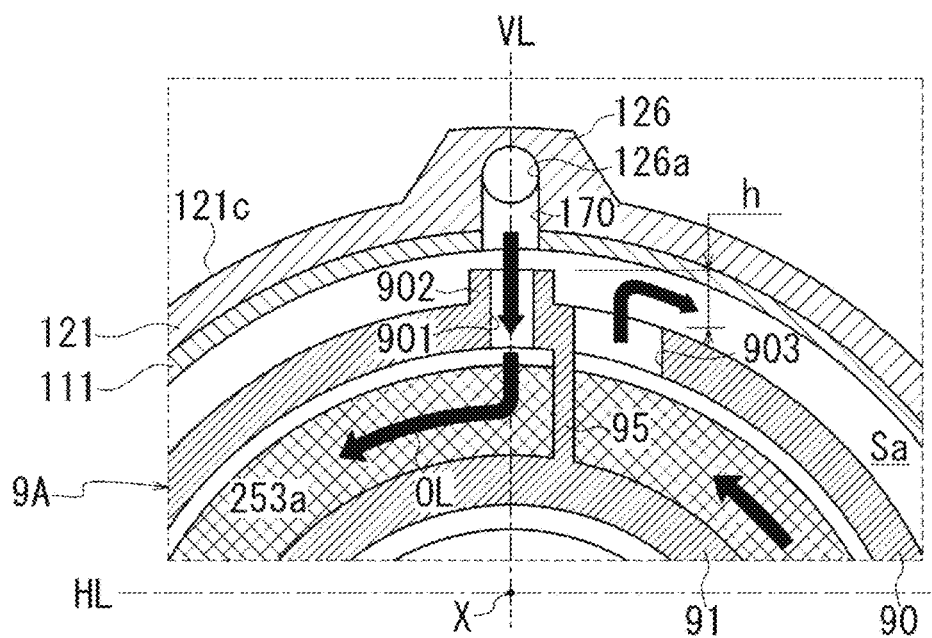
FIG. 17 is a diagram illustrating the flow of oil around the coil end.

FIG. 17 is a diagram illustrating flow of the oil OL around the coil end 253*a*. FIG. 17 is a schematic diagram of an A-A cross section in FIG. 16.

As shown in FIG. 16, the cover member 9A has the same structure as the cover member 9B described above.

The cover member 9A includes the outer peripheral wall 90, the inner peripheral wall 91, and the connection wall 92. The outer peripheral wall 90 has a tubular shape surrounding the outer peripheral surface 253*a*1 of the coil end 253*a* with a gap therebetween. The inner peripheral wall 91 has a tubular shape that can be internally inserted into the inner peripheral surface 253*a*2 of the coil end 253*a*. The connection wall 92 faces the end surface 253*a*3 of the coil end 253*a* with a gap therebetween in the rotation axis X direction. Hereinafter, the outer peripheral surface 253*a*1, the inner peripheral surface 253*a*2, and the end surface 253*a*3 are collectively referred to as a surface 253*a*4.

As shown in FIG. 16, the connection wall 92 overlaps the coil end 253*a* and the wall portion 130 in the rotation axis X direction. The connection wall 92 is disposed substantially parallel to the end surface 253*a*3 of the coil end 253*a*, and connects the end portions of the outer peripheral wall 90 and the inner peripheral wall 91 to each other.

The outer peripheral wall 90 overlaps the coil end 253*a* and the support wall portion 111 in the radial direction of the rotation axis X. A locking portion 90*a* extending to the inner diameter side is provided at the tip of the outer peripheral wall 90. The locking portion 90*a* is formed by bending the tip side of the outer peripheral wall 90 toward the inner diameter side. The locking portion 90*a* is inserted into the gap Ca between the coil end 253*a* and the teeth portion 252.

The inner peripheral wall 91 overlaps the coil end 253*a* and the motor support portion 135 in the radial direction of the rotation axis X. The inner peripheral wall 91 is provided crossing between the outer periphery of the rotor core 21 and the coil end 253*a* of the stator core 25 in the radial direction of the rotation axis X of the motor 2.

The cover member 9A is also mounted on the coil end 253*a* such that the tip 91*a* of the inner peripheral wall 91 is brought into contact with the teeth portion 252 from the rotation axis X direction, and the locking portion 90*a* is locked to a side surface of the coil end 253*a* on the teeth portion 252 side.

When the cover member 9A is mounted to the coil end 253*a*, the coil end 253*a* is accommodated in the space K (accommodation chamber K) surrounded by the outer peripheral wall 90, the inner peripheral wall 91, and the connection wall 92 of the cover member 9A. In this state, a gap through which the oil OL can flow is formed between a lateral side and an upper side of the coil end 253*a* and the cover member 9A. That is, the accommodation chamber K of the cover member 9A accommodates the coil end 253*a*, which is at least a part of the stator core 25. The accommodation chamber K of the cover member 9A is a space separated from the rotor core 21 of the motor 2 within the motor chamber Sa. The volume of the accommodation chamber K is smaller than the volume of the motor chamber Sa.

As shown in FIG. 17, the outer peripheral wall 90 of the cover member 9A is formed with the through hole 901 penetrating through the outer peripheral wall 90 and the cylindrical wall portion 902 surrounding the through hole 901.

As shown in FIG. 16, the through hole 901 is provided in the outer peripheral wall 90 when viewed from the radial direction of the rotation axis X overlapping the coil end 253*a*.

In the outer peripheral wall 90, the through hole 901 is provided at a position facing the oil passage 170 (oil hole 170*a*) in the vertical line VL direction (in the up-down direction in the drawing) when the cover member 9A is mounted on the coil end 253*a*.

As shown in FIG. 17, the through hole 903 that penetrates the outer peripheral wall 90 in the vertical line VL direction is formed at a position adjacent to the through hole 901 when viewed from the rotation axis X direction.

The through hole 903 is offset in the circumferential direction around the rotation axis X with respect to the through hole 901 when viewed from the rotation axis X direction. The through hole 903 is positioned above the horizontal line HL passing through the rotation axis X together with the through hole 901.

The partition wall 95 is provided in the cover member 9A between the through holes 901 and 903 adjacent to each other in the circumferential direction around the rotation axis X. The partition wall 95 constitutes a partition portion that partitions the internal space of the accommodation chamber K. The partition wall 95 is also positioned above the horizontal line HL passing through the rotation axis X.

Inside the cover member 9A, a flow path for the oil OL that makes a full circle in the circumferential direction around the rotation axis X is formed from one end where the through hole 901 opens to the other end where the through hole 903 opens by the partition wall 95.

As shown in FIG. 14, the oil OL that travels substantially around the accommodation chamber K of the cover member 9B is discharged from the through hole 903 into the motor chamber Sa. As shown in FIG. 17, the oil OL that travels substantially around the accommodation chamber K of the cover member 9A is also discharged from the through hole 903 into the motor chamber Sa.

As shown in FIG. 12, the oil OL discharged into the motor chamber Sa can move to the oil reservoir portion 128 through the oil passages 180 and 181 described above. The strainer 80 is disposed in the gear chamber Sb that communicates with the oil reservoir portion 128.

The strainer 80 will be described below.

Figure 18:
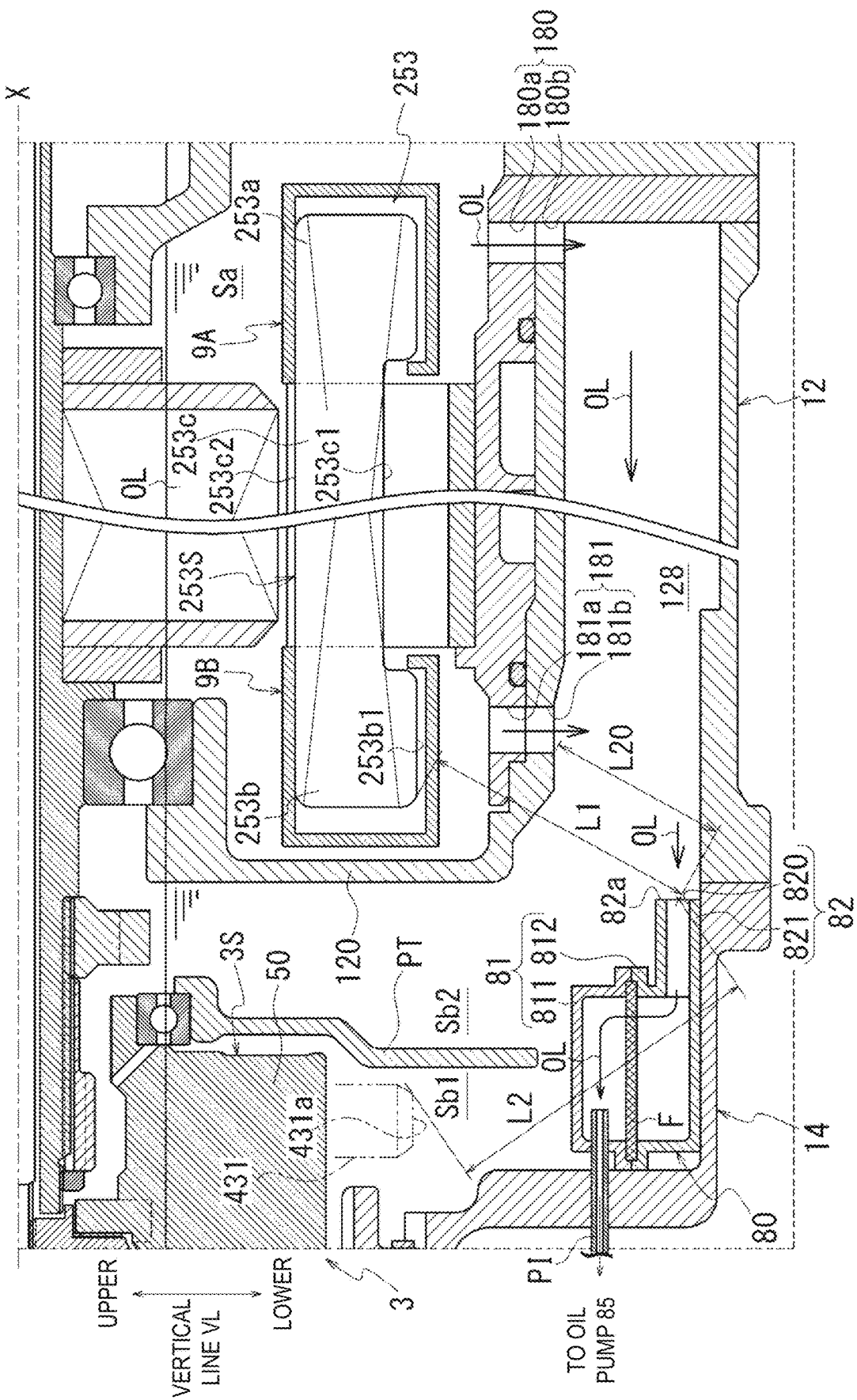
FIG. 18 is a diagram illustrating a strainer.

FIG. 18 is a diagram illustrating the strainer 80. FIG. 18 shows a cross section of the strainer 80. FIG. 18 also illustrates the large-diameter gear portion 431, which passes through the lowest position in the vertical line VL direction when the differential case 50 rotates, by virtual lines.

The strainer 80 is disposed inside the gear chamber Sb of the fourth box 14. The strainer 80 is disposed below the plate member PT within the gear chamber Sb. The strainer 80 is fixed to an inner wall of the fourth box 14 by a fixture (not shown).

As shown in FIG. 18, the strainer 80 includes a main body portion 81 and a suction portion 82. The main body portion 81 is, for example, a hollow container. The suction portion 82 is, for example, a tubular member protruding from the main body portion 81.

The main body portion 81 is a hollow container including an upper case 811 and a lower case 812. A filter F for filtering the oil OL is interposed between the upper case 811 and the lower case 812. For example, a known nonwoven fabric can be used as the filter F.

The suction portion 82 includes a through hole 820 penetrating the lower case 812 and a cylindrical wall portion 821 surrounding the through hole 820. A tip of the cylindrical wall portion 821 of the suction portion 82 serves as an open end 82a where the through hole 820 is opened. That is, the suction portion 82 constitutes a suction port of the strainer 80.

The suction portion 82 protrudes from the main body portion 81 toward the second box 12 in the rotation axis X direction. The open end 82a of the suction portion 82 is provided at a position facing the oil reservoir portion 128 in the rotation axis X direction in the second gear chamber Sb2.

As shown in FIG. 18, with the strainer 80 fixed to the fourth box 14, the suction portion 82 is positioned between the coil end 253b and the gear mechanism 3 in the rotation axis X direction. The main body portion 81 is connected to a suction port 85a (see FIG. 2) of an oil pump 85 provided outside the main body box 10 via a pipe PI connected to the upper case 811. For example, an electric oil pump driven by a motor (not shown) can be used as the oil pump 85. Driving of the oil pump 85 is controlled by a control device (not shown).

As shown in FIG. 2, a discharge port 85b of the oil pump 85 is connected to oil holes Ha and Hc formed in an upper portion of the main body box 10 via a pipe (not shown).

As shown in FIG. 2, the oil hole Ha is formed above the planetary reduction gear 4 of the support wall portion 146 of the fourth box 14. The oil hole Hc is formed above the connection wall 136 in the third box 13.

As shown in FIG. 18, with the strainer 80 fixed to the fourth box 14, the suction portion 82 is immersed in the oil OL reserved in the gear chamber Sb. In this state, the open end 82a of the suction portion 82 is disposed at a position that satisfies the following conditions.

(i) Among distances (linear distances) connecting the open end 82a and a surface 253S of the coil 253, a distance connecting the open end 82a and the outer peripheral surface 253b1 of the coil end 253b is the shortest distance L1.

Note that the surface 253S of the coil 253 is a surface of the entire coil 253 including the outer peripheral surface 253c1, the inner peripheral surface 253c2 of the base portion 253c, and the surfaces 253a4 and 253b4 of the coil ends 253a and 253b (see FIGS. 13 and 16).

(ii) Among distances (linear distances) connecting the open end 82a and a surface 3S of the gear mechanism 3, a distance connecting the open end 82a and the outer peripheral surface 431a (see the virtual line) of the large-diameter gear portion 431 of the planetary reduction gear 4 is the shortest distance L2.

Note that the surface 3S of the gear mechanism 3 is a boundary surface between the planetary reduction gear 4 and the differential mechanism 5 and the gear chamber Sb.

(iii) The shortest distance L1 is shorter than the shortest distance L2 (L1<L2).

Functions of the power transmission device 1 having such a configuration will be described.

As shown in FIG. 1, in the power transmission device 1, the gear mechanism 3 (the planetary reduction gear 4 and the differential mechanism 5) and the drive shafts DA and DB (drive shafts) are arranged along the transmission path of the output rotation of the motor 2.

As shown in FIG. 2, when the rotor core 21 rotates around the rotation axis X driven by the motor 2, the rotation is input to the sun gear 41 of the planetary reduction gear 4 via the motor shaft 20 that rotates together with the rotor core 21.

As shown in FIG. 3, in the planetary reduction gear 4, the sun gear 41 serves as an input unit for the output rotation of the motor 2. The differential case 50 that supports the stepped pinion gear 43 serves as an output unit for the input rotation.

When the sun gear 41 rotates around the rotation axis X due to the input rotation, the stepped pinion gear 43 (the large-diameter gear portion 431 and the small-diameter gear portion 432) rotates around the axis line X1 due to the rotation input from the sun gear 41 side.

Here, the small-diameter gear portion 432 of the stepped pinion gear 43 meshes with the ring gear 42 fixed to the inner periphery of the fourth box 14. Therefore, the stepped pinion gear 43 revolves around the rotation axis X while rotating around the axis line X1.

Here, the outer diameter R2 of the small-diameter gear portion 432 of the stepped pinion gear 43 is smaller than the outer diameter R1 of the large-diameter gear portion 431 (see FIG. 3).

As a result, the differential case 50 (the first case portion 6 and the second case portion 7) that supports the stepped pinion gear 43 rotates around the rotation axis X at a rotation speed lower than that of the rotation input from the motor 2 side.

Therefore, the speed of the rotation input to the sun gear 41 of the planetary reduction gear 4 is greatly reduced by the stepped pinion gear 43. The speed-reduced rotation is output to the differential case 50 (differential mechanism 5).

Then, when the differential case 50 rotates around the rotation axis X due to the input rotation, the drive shafts DA and DB meshing with the pinion mate gear 52 rotate around the rotation axis X within the differential case 50. As a result, the left and right driving wheels W and W (see FIG. 1) of the electric vehicle EV equipped with the power transmission device 1 are rotated by the transmitted rotational driving force.

As shown in FIG. 2, the oil OL for lubricating is reserved inside the fourth box 14 (gear chamber Sb). Therefore, the reserved oil OL is scraped up by the differential case 50 (stepped pinion gear 43) rotating around the rotation axis X when the output rotation of the motor 2 is transmitted. The entire gear mechanism 3 is lubricated by the scraped up oil OL.

Specifically, a meshing portion between the sun gear 41 and the large-diameter gear portion 431, a meshing portion between the small-diameter gear portion 432 and the ring gear 42, and the meshing portion between the pinion mate gear 52 and the side gears 54A and 54B are lubricated by the scraped up oil OL.

As shown in FIG. 8, the differential case 50 rotates around the rotation axis X in the counterclockwise direction CCW when viewed from the third box 13 side.

The oil catch portion 15 is provided on the upper portion of the fourth box 14. The oil catch portion 15 is positioned downstream of the rotational direction of the differential case 50. Most of the oil OL scraped up by the differential case 50 flows into the oil catch portion 15.

As shown in FIG. 12, a part of the oil OL that flows into the oil catch portion 15 flows from the catch portion 153 to the guide portion 154 side, and then flows into the oil passage 126a. The oil OL that flows into the oil passage 126a is discharged from the oil passages 170 and 171.

As shown in FIGS. 14 and 17, most of the oil OL discharged from the oil passages 171 and 170 passes through the through holes 901 and 901 that open below the oil passages 171 and 170 in the vertical line VL direction, respectively, and then flows into the cover members 9B and 9A. As described above, the partition walls 95 and 95 are provided inside the cover members 9B and 9A, respectively.

As shown in FIG. 14, in the accommodation chamber K in the cover member 9B, a flow path for the oil OL that makes a substantially full circle in the circumferential direction around the rotation axis X is formed, by the partition wall 95, extending from a region where the through hole 901 is provided to a region where the through hole 903 is provided. As shown in FIG. 17, also in the accommodation chamber K in the cover member 9A, a flow path for the oil OL that makes a substantially full circle in the circumferential direction around the rotation axis X is formed, by the partition wall 95, extending from a region where the through hole 901 is provided to a region where the through hole 903 is provided.

Most of the oil OL that flows into the accommodation chamber K can be reserved in the cover members 9B and 9A.

Furthermore, as shown in FIG. 14, in the cover member 9B, the cylindrical wall portion 902 surrounding the through hole 901 protrudes upward in the vertical line VL direction. A lower end of the through hole 903 in the vertical line VL direction is positioned lower than an upper end of the cylindrical wall portion 902 by a height h. Therefore, the oil OL that flows into the accommodation chamber K can be reserved in the accommodation chamber K up to a height of the lower end of the through hole 903. As shown in FIG. 17, in the cover member 9A, the cylindrical wall portion 902 surrounding the through hole 901 protrudes upward in the vertical line VL direction. The lower end of the through hole 903 in the vertical line VL direction is positioned lower than the upper end of the cylindrical wall portion 902 by a height h. Therefore, the oil OL that flows into the accommodation chamber K can be reserved in the accommodation chamber K up to a height of the lower end of the through hole 903.

As shown in FIGS. 14 and 17, the oil OL continuously flows into the accommodation chamber K from the through hole 901. The oil OL that flows into the accommodation chamber K flows through the accommodation chamber K in one direction in the circumferential direction around the rotation axis X (arrow directions in FIGS. 14 and 17), and then is discharged into the motor chamber Sa through the through hole 903.

In this case, the coil ends 253b and 253a are immersed in the oil OL in the accommodation chamber K over substantially the entire circumferential direction. The oil OL exchanges heat with the coil ends 253b and 253a in the process of moving in the accommodation chamber K toward the through hole 903. The heat exchange cools the coil end 253b and warms the oil OL.

Here, a material of the wire that constitutes the coil 253 is copper, which has high thermal conductivity. Therefore, when the coil ends 253a and 253b are cooled, the entire coil 253 is cooled by heat conduction, and finally the entire stator core 25 including the yoke portion 251 and the teeth portion 252 is cooled.

As shown in FIGS. 14 and 17, the oil OL discharged from the through hole 903 of the cover member 9A and the through hole 903 of the cover member 9B moves downward in the motor chamber Sa due to its own weight, and then reserved in the lower portion of the motor chamber Sa.

As shown in FIG. 12, the oil passages 180 and 181 open downward in the vertical line VL direction. The motor chamber Sa communicates with the oil reservoir portion 128 via the oil passages 180 and 181 in a lower region in the vertical line VL direction.

When the differential case 50 rotates around the rotation axis X, the oil OL in the gear chamber Sb is scraped up by the rotating differential case 50. As a result, a flow of the oil OL is formed from the motor chamber Sa toward the gear chamber Sb, and the oil OL in the oil reservoir portion 128 moves toward the gear chamber Sb.

The oil reservoir portion 128 communicates with the motor chamber Sa via the oil passages 180 and 181. Therefore, the oil OL staying in the lower portion of the motor chamber Sa flows into the oil reservoir portion 128 side through the oil passages 180 and 181.

By driving the oil pump 85, suction of the oil pump 85 generates a negative pressure. This negative pressure promotes movement of the oil OL in the oil reservoir portion 128 toward the gear chamber Sb (see an arrow in FIG. 18).

As a result, the oil OL staying in the lower portion of the motor chamber Sa is promoted to move toward the oil reservoir portion 128 through the oil passages 180 and 181.

As shown in FIG. 18, the suction portion 82 of the strainer 80 is positioned in the second gear chamber S*b*2. The suction portion 82 is disposed with the open end 82a directed toward the oil passages 180 and 181 side.

A part of the oil OL that moves from the oil reservoir portion 128 to the gear chamber Sb side through the oil passages 180 and 181 is sucked from the open end 82a of the suction portion 82 positioned inside the second gear chamber S*b*2 into the main body portion 81 of the strainer 80, and then reaches the first gear chamber S*b*1 where the rotating differential case 50 is positioned.

The oil OL sucked into the main body portion 81 is filtered by the filter F and then sucked from the suction port 85a (see FIG. 2) into the oil pump 85 through the pipe PI.

As shown in FIG. 2, the oil OL sucked by the oil pump 85 is pressurized by a predetermined pressure and then discharged from the discharge port 85b. The discharged oil OL is supplied to the oil holes Ha and Hc inside the main body box 10 via pipes (not shown).

As shown in FIG. 2, the oil OL supplied to the oil hole Ha lubricates the planetary reduction gear 4 in the fourth box 14 and around the differential case 50. The oil OL supplied to the oil hole Hc travels along the connection wall 136 and lubricates the bearing B1.

As shown in FIG. 12, of the oil OL in the second gear chamber Sb2, the oil OL that is not sucked from the suction portion 82 of the strainer 8 moves to the first gear chamber Sb 1 due to the flow caused by the rotation of the differential case 50, and then is scraped up by the rotating differential case 50.

Here, in a low-temperature environment where an outside temperature, such as winter, is low, the viscosity of the oil OL may increase or the oil OL may become sherbet-like.

In such a case, since the fluidity of the oil OL is low, the amount of the oil OL sucked by the oil pump 85 is reduced. As the amount of suction decreases, the amount of the oil OL discharged from the oil pump 85 also decreases.

In the electric vehicle EV, the motor 2 serves as a heat source. Specifically, in the motor 2, the coil 253 (the coil ends 253a and 253b, and the base portion 253c) through which a current flows serves as a heat source.

In the present embodiment, as shown in FIG. 12, the oil OL caught by the oil catch portion 15 is supplied to the coil ends 253a and 253b of the coil 253, which is a heat source, through the oil passage 126a.

The oil OL supplied from the oil passage 126a is warmed by heat exchange with the coil ends 253a and 253b when passing through the insides of the cover members 9A and 9B covering the coil ends 253a and 253b.

Therefore, the fluidity of the oil OL is higher than when the oil OL is not warmed by the heat exchange with the coil ends 253a and 253b.

As described above, the oil OL warmed by the heat exchange with the coil ends 253a and 253b is returned to the lower portion of the motor chamber Sa and the oil reservoir portions 128 positioned in the lower portion of the motor chamber Sa.

The oil OL sucked toward the strainer 80 by the driving of the electric oil pump 85 is the oil OL in the motor chamber Sa and the oil reservoir portion 128.

When the oil OL returned to the motor chamber Sa and the oil reservoir portion 128 is warmed by the heat exchange with the coil ends 253a and 253b, the oil OL with increased fluidity is sucked to the electric oil pump 85 side.

Therefore, the fluidity of the oil OL is higher than when the oil OL is not warmed by the heat exchange with the coil ends 253a and 253b.

As a result, the oil pump 85 can reduce the suction of the oil OL that becomes highly viscous or sherbet-like in a low-temperature environment. Therefore, the decrease in the amount of the oil OL discharged by the oil pump 85 can be reduced.

As shown in FIG. 18, the shortest distance L1 from the open end 82a of the suction portion 82 to the outer peripheral surface 253b1 of the coil end 253b is set to be shorter than the shortest distance L2 from the open end 82a of the suction portion 82 to the outer peripheral surface 431a of the large-diameter gear portion 431 of the planetary reduction gear 4 (L1<L2).

As a result, the open end 82a of the suction portion 82 is brought closer to the coil end 253b, which is a heat source, and is kept away from the gear mechanism 3. Therefore, the oil pump 85 can take in the warmed oil OL.

The differential case 50 rotates around the rotation axis X and scrapes up the oil OL in the gear chamber Sb, thereby locally lowering a level of the oil OL in the gear chamber Sb. In such a case, when the suction port of the oil pump is positioned within the gear chamber Sb, there is a possibility that air will be sucked.

As described above, by disposing the open end 82a of the suction portion 82 away from the gear mechanism 3, the influence when the oil level drops due to the rotation of the differential case 50 during normal operation (for example, air sucking by the electric oil pump 85) can be suitably reduced.

As described above, the power transmission device 1 according to the present embodiment has the following configuration.

(1) The power transmission device 1 includes:
  the motor 2;
  the gear mechanism 3 connected downstream of the motor 2; and
  the oil pump 85 (pump) that sucks the oil OL through the suction portion 82 (pump inlet) of the strainer 80.

The stator core 25 of the motor 2 includes the coil 253.

The gear mechanism 3 includes a planetary reduction gear 4.

Among the distances connecting the open end 82a of the suction portion 82 and the surface 253S of the coil 253, the distance connecting the open end 82a of the suction portion 82 and the outer peripheral surface 253b1 of the coil end 253b is the shortest distance L1.

Among the distances connecting the open end 82a of the suction portion 82 and the surface 3S of the gear mechanism 3, the distance connecting the open end 82a of the suction portion 82 and the outer peripheral surface 431a of the large-diameter gear portion 431 of the planetary reduction gear 4 is the shortest distance L2. The shortest distance L1 is shorter than the shortest distance L2.

With such a configuration, it is possible to provide a structure for reducing decrease in the discharge amount of the pump at a low temperature. Specifically, by bringing the open end 82a of the suction portion 82 serving as the pump inlet closer to the coil end 253b of the motor 2 serving as a heat source, the oil OL heated by the heat exchange with the coil end 253b can be sucked. As a result, it is possible to reduce the decrease in the amount of the oil discharged from the oil pump 85 at a low temperature. By keeping the open end 82a of the suction portion 82 away from the gear mechanism 3, it is possible to reduce the influence of the lowering of the oil level due to the rotation of the differential case 50 during normal operation.

The power transmission device 1 has the following configuration.

(2) The power transmission device 1 includes the accommodation chamber K that accommodates the coil ends 253a and 253b that are at least a part of the stator core 25.

The oil OL in the accommodation chamber K discharged to the oil reservoir portion 128 is introduced into the suction portion 82 via the oil passages 180 and 181 (discharge holes).

The accommodation chamber K is a space separated from the gear chamber Sb in which the gear mechanism 3 is positioned.

In the accommodation chamber K, the oil OL introduced into the accommodation chamber K is warmed by heat exchange with the coil ends 253*a* and 253*b*. The warmed oil OL finally flows into the oil reservoir portion 128 through the oil passages 180 and 181.

By configuring as described above and disposing the suction portion 82 at a position close to the oil passage 181, it is possible to preferentially introduce the warmed oil OL to the oil pump 85.

Therefore, when the temperature of the oil OL is low in a low-temperature environment, it is more effective to reduce the decrease in the amount of the oil OL discharged from the oil pump 85 due to the decrease in the amount of the oil OL sucked into the oil pump 85.

Note that as a structure for introducing the oil OL, which is discharged from the accommodation chamber K into the motor chamber Sa and then moves to the oil reservoir portion 128 through the oil passages 180 and 181, to the suction portion 82, there are, for example, the following aspects, but the present invention is not limited only to these aspects.

(a) A shortest distance L20 (see FIG. 18) between the open end 82*a* of the suction portion 82 and the lower end of the oil passage 181 is set to be shorter than the shortest distance L2 between the open end 82*a* of the suction portion 82 and the outer peripheral surface 431*a* of the large-diameter gear portion 431 of the planetary reduction gear 4.

(b) The suction portion 82 and the oil passages 180 and 181 are directly connected to each other using a pipe or the like.

(c) The oil OL discharged from the oil passages 180 and 181 is introduced into the suction portion 82 via an in-box oil passage provided in the main body box 10.

(d) A guide member such as a guide rib that guides the oil OL discharged from the oil passages 180 and 181 toward the suction portion 82 is provided in the main body box 10 itself, or mounted to the main body box 10 as a separate member (a guide plate or the like).

The power transmission device 1 has the following configuration.

(3) The power transmission device 1 includes:
  the motor 2;
  the gear mechanism 3 connected downstream of the motor 2;
  the oil pump 85 that sucks the oil OL through the suction portion 82 of the strainer 80; and
  the accommodation chamber K that accommodates the coil ends 253*a* and 253*b* that are at least a part of the stator core 25.

The oil OL in the accommodation chamber K discharged through the oil passages 180 and 181 (discharge holes) is introduced into the suction portion 82.

The oil OL supplied into the accommodation chamber K separated from the gear mechanism 3 is warmed by heat exchange with the coil ends 253*a* and 253*b*. The warmed oil OL finally flows into the oil reservoir portion 128 through the oil passages 180 and 181.

With the above configuration, by disposing the suction portion 82 at a position close to the oil passage 181, it is possible to preferentially introduce the warmed oil OL to the oil pump 85. Therefore, when the temperature of the oil OL is low in a low-temperature environment, it is more effective to reduce the decrease in the amount of the oil OL discharged from the oil pump 85 due to the decrease in the amount of the oil OL sucked into the oil pump 85.

Note that as a structure for introducing the oil OL that moves to the oil reservoir portion 128 through the oil passages 180 and 181 to the suction portion 82, there are, for example, the following aspects, but the present invention is not limited only to these aspects.

(a) A shortest distance L20 (see FIG. 18) between the open end 82*a* of the suction portion 82 and the lower end of the oil passage 181 is set to be shorter than the shortest distance L2 between the open end 82*a* of the suction portion 82 and the outer peripheral surface 431*a* of the large-diameter gear portion 431 of the planetary reduction gear 4.

(b) The suction portion 82 and the oil passages 180 and 181 are directly connected to each other using a pipe or the like.

(c) The oil OL discharged from the oil passages 180 and 181 is introduced into the suction portion 82 via an in-box oil passage provided in the main body box 10.

(d) A guide member such as a guide rib that guides the oil OL discharged from the oil passages 180 and 181 toward the suction portion 82 is provided in the main body box 10 itself, or mounted to the main body box 10 as a separate member (a guide plate or the like).

The power transmission device 1 has the following configuration.

(4) The suction portion 82 opens toward the oil passages 180 and 181.

The oil passages 180 and 181 are inlets to the oil reservoir portion 128 for the oil OL warmed by the heat exchange with the coil ends 253*a* and 253*b*. The heated oil OL can be sucked into the oil pump 85 by opening the suction portion 82 toward the inlets.

Therefore, when the temperature of the oil OL is low in a low-temperature environment, it is more effective to reduce the decrease in the amount of the oil OL discharged from the oil pump 85 due to the decrease in the amount of the oil OL sucked into the oil pump 85.

The power transmission device 1 has the following configuration.

(5) Inside the motor chamber Sa, the accommodation chamber K is formed as a space separated from the rotor core 21 of the motor 2.

By forming the accommodation chamber K in the motor chamber Sa as a space separated from the rotor core 21 of the motor 2, the volume of the accommodation chamber K can be reduced.

When the accommodation chamber K is formed without being separated from the rotor core 21 of the motor 2, the volume of the accommodation chamber K is increased by the volume of the rotor core 21 of the motor 2.

Therefore, by forming the accommodation chamber K as a space in the motor chamber Sa and separated from the rotor core 21 of the motor 2, the volume of the accommodation chamber K can be reduced compared as the case where the accommodation chamber K is not separated from the rotor core 21 of the motor 2.

Accordingly, even if the amount of the oil OL is reduced, a contact area between the oil OL and the coil ends 253*a* and 253*b* can be increased, thereby improving heat exchange efficiency.

The power transmission device 1 has the following configuration.

(6) The accommodation chamber K has a shape that encloses the coil ends 253*a* and 253*b* of the stator core 25 of the motor 2.

For example, when the coil ends 253a and 253b are not enclosed in the accommodation chamber K, the oil OL cannot be reserved around the coil ends 253a and 253b. As a result, the contact area between the coil ends 253a and 253b and the oil OL is reduced, so that the heat exchange efficiency is reduced. In this case, in order to increase the heat exchange efficiency, it is necessary to increase the amount of the oil OL supplied from the oil passage 126a to the coil ends 253a and 253b. As a result, the amount of the oil OL used increases, which leads to an increase in a total weight and cost of the power transmission device 1.

Therefore, with the configuration described above, the oil OL can be reserved around the coil ends 253a and 253b. Therefore, the contact area between the coil ends 253a, 253b and the oil OL can be increased. Therefore, the contact area between the stator core 25 and the oil OL can be increased even by a small amount, and heat can be exchanged efficiently.

Here, in the present embodiment, the accommodation chamber K is exemplified as a ring-shaped one that surrounds the entire coil ends 253a and 253b in the circumferential direction around the rotation axis X, but the present invention is not limited to this aspect. For example, the accommodation chamber K may include an arcuate portion that surrounds at least a part of the coil ends 253a and 253b in the circumferential direction around the rotation axis X.

That is, the power transmission device 1 has the following configuration.

(7) When viewed from the rotation axis X direction, the accommodation chamber K has a shape including an arcuate portion that surrounds the coil ends 253a and 253b of the stator core 25 of the motor 2.

For example, the cover members 9A and 9B, which are arc-shaped when viewed in the rotation axis X direction, form the accommodation chamber K and cover regions of the coil ends 253a and 253b located above the oil level in the main body box 10.

In this case, a contact time between the oil OL introduced into the accommodation chamber K and the coil ends 253a and 253b can be lengthened, so that the efficiency of heat exchange can be improved.

Note that the shape including an arcuate portion includes an annular shape, an annular shape with a notch, and the like.

Examples of the "annular shape" include a shape of the accommodation chamber K formed when the entire coil ends 253a and 253b are surrounded around the rotation axis X with the cover members 9A and 9B as in the present embodiment.

Although not shown, examples of the "annular shape with a notch" include a shape of the accommodation chamber K formed when a region between the through hole 901 and the through hole 903 of the cover members 9A and 9B in the circumferential direction around the rotation axis X is notched. In this case, the accommodation chamber K has a substantially C shape when viewed from the rotation axis X direction.

The power transmission device 1 has the following configuration.

(8) The oil passages 180 and 181 are open downward in the up-down direction (toward a lower side).

With such a configuration, the oil passages 180 and 181 can discharge the oil OL warmed by gravity by opening directly downward or obliquely downward. As a result, a discharge efficiency of the warmed oil OL can be enhanced, and the amount of oil introduced into the suction portion 82 at a low temperature can be increased.

The power transmission device 1 has the following configuration.

(9) The suction portion 82 is configured as a suction port of the strainer 80 including the filter F therein.

With such a configuration, each part can be lubricated and cooled using the oil OL from which impurities are removed by filtering the oil OL sucked from the suction portion 82 with the filter F.

The power transmission device 1 has the following configuration.

(10) The drive shaft DA (drive shaft) is disposed passing through the inner periphery of the motor 2. The drive shaft DA passing through the inner periphery of the motor 2 is connected downstream of the gear mechanism 3.

With such a configuration, the height of the oil level in the main body box 10 can be lowered to reduce stirring resistance of the gear mechanism 3, and a decrease in a flow rate of the oil OL at a low temperature can be reduced.

In the power transmission device 1 having such a configuration, an area occupied by the motor 2, the planetary reduction gear 4, and the differential mechanism 5 in the main body box 10 is large, and a space below each in the outer diameter direction tends to be small. When a volume of such a space region becomes small, the height of the stored oil OL (oil level) tends to be larger than when the volume is large, even with the same amount of the oil OL. As the oil level rises, the stirring resistance due to the scraping up of the differential case 50 increases, so there is a demand to keep the oil level as low as possible. In the power transmission device 1 having such a configuration, forming the suction portion 82 (oil pump inlet) on the inner wall of the fourth box 14 of the main body box 10 can easily lower the oil level in the gear chamber Sb, and thus is particularly effective.

In such a power transmission device 1, when the amount of the oil OL is reduced to lower the oil level, the temperature of the oil OL as in a low temperature environment is low, and when the fluidity of the oil OL is lowered, the amount of the oil OL sucked into the oil pump is reduced according to the decrease in fluidity, and the amount of the oil OL discharged from the oil pump is reduced.

By adopting the above configuration of the present invention, even if the fluidity of the oil OL is reduced, the amount of the oil OL sucked by the oil pump can be ensured, so that it is possible to preferably reduce the occurrence of the decreasing situation in the amount of the oil OL discharged from the oil pump.

Thus, it is particularly effective to employ the above configuration of the present invention in a power transmission device having a structure that requires a lower oil level.

Modification 1

A power transmission device 1A according to Modification 1 will be described below.

Note that in the following description, portions different from the power transmission device 1 described above will be described. Parts common to the above-described power transmission device 1 are denoted by the same reference numerals.

Figure 19:
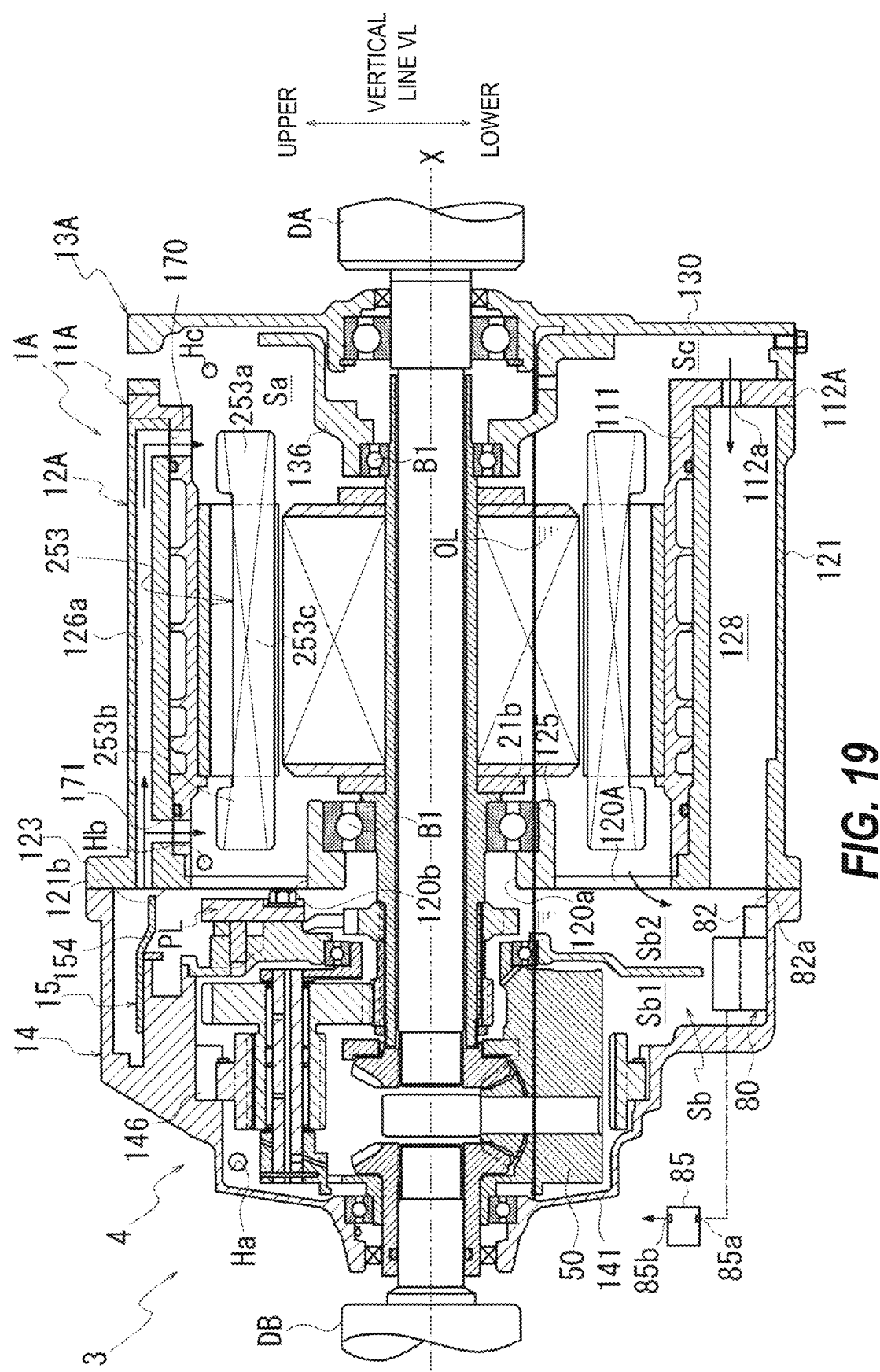
FIG. 19 is a diagram illustrating a power transmission device according to Modification 1.

FIG. 19 is a diagram illustrating the power transmission device 1A according to Modification 1.

Figure 20:
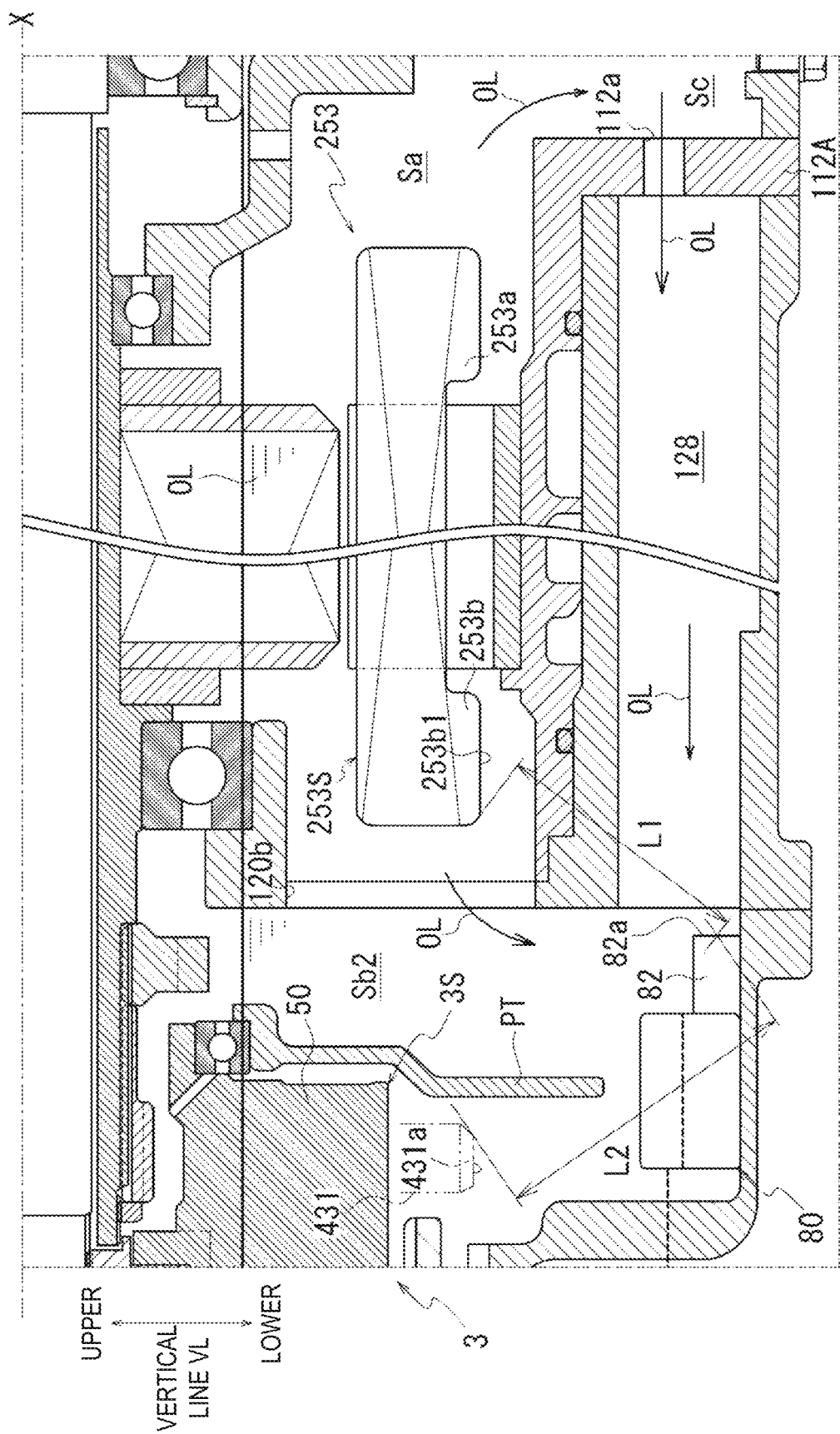
FIG. 20 is a diagram illustrating the power transmission device according to Modification 1.

FIG. 20 is a diagram illustrating flow of the oil around the strainer 80. In FIG. 20, for convenience of explanation, a part of the power transmission device 1A is omitted to shorten the length in the rotation axis X direction.

Note that FIG. 20 also illustrates the large-diameter gear portion 431, which passes through the lowest position in the vertical line VL direction when the differential case 50 rotates, by virtual lines.

As shown in FIG. 19, the power transmission device 1A according to Modification 1 does not include the cover members 9A and 9B. Therefore, the coil ends 253a and 253b are exposed in the motor chamber Sa without being covered by the cover members 9A and 9B, respectively.

In the up-down direction with respect to a mounting state of the power transmission device 1A, the peripheral wall portion 121 of the second box 12A has a larger thickness in the radial direction of a lower region than that of other regions.

The oil reservoir portion 128 is formed inside the portion where the thickness in the radial direction is larger.

An opening of the oil reservoir portion 128 on a third box 13A side (the right side in the drawing) is sealed by a flange-like joint portion 112A of a first box 11A.

A through hole 112a is formed in the joint portion 112A so as to penetrating through the joint portion 112A in the rotation axis X direction. The through hole 112a allows the oil reservoir portion 128 and a space Sc formed between the first box 11A and the third box 13A to communicate with each other.

This space Sc communicates with the motor chamber Sa in a lower region in the vertical line VL direction. Therefore, the motor chamber Sa communicates with the oil reservoir portion 128 via the space Sc and the through hole 112a.

As shown in FIG. 19, a beam portion 120A for supporting the motor support portion 125 is provided on the inner diameter side of the flange portion 123 at the other end 121b of a second box 12A. The beam portion 120A is provided across the inner periphery of the flange portion 123 and the outer periphery of the motor support portion 125.

A plurality of the beam portions 120A are provided in the circumferential direction around the rotation axis X at intervals. Between the beam portions 120A and 120A adjacent to each other in the circumferential direction around the rotation axis X, there is an opening 120b that allows the motor chamber Sa and the gear chamber Sb (the second gear chamber Sb2) to communicate with each other.

The motor support portion 125 surrounds the rotation axis X with a gap therebetween and extends into the motor chamber Sa. The tip side of the motor support portion 125 is inserted into the coil end 253b.

A tip portion of the motor support portion 125 faces the end portion 21b of the rotor core 21 with a gap in the rotation axis X direction.

The bearing B1 is supported on the inner periphery of the motor support portion 125. The outer periphery of the motor shaft 20 is supported by the motor support portion 125 via the bearing B1.

In the power transmission device 1A, the motor chamber Sa is formed within a first box 11A between the beam portion 120A of the second box 12A and the wall portion 130 of the third box 13A.

The gear chamber Sb is formed within the fourth box 14 and between the beam portion 120A of the second box 12A and the peripheral wall portion 141 of the fourth box 14. The motor chamber Sa and the gear chamber Sb communicate with each other through the opening 120b of the beam portion 120A.

Here, the strainer 80 is fixed inside the fourth box 14. As shown in FIG. 20, the suction portion 82 of the strainer 80 is positioned between the coil end 253b and the gear mechanism 3 in the rotation axis X direction. The suction portion 82 of the strainer 80 is immersed in the oil OL reserved in the gear chamber Sb. In this state, the open end 82a of the suction portion 82 is disposed at a position that satisfies the following conditions.

(i) Among distances (linear distances) connecting the open end 82a and a surface 253S of the coil 253, a distance connecting the open end 82a and the outer peripheral surface 253b1 of the coil end 253b is the shortest distance L1.

(ii) Among distances (linear distances) connecting the open end 82a and a surface 3S of the gear mechanism 3, a distance connecting the open end 82a and the outer peripheral surface 431a of the large-diameter gear portion 431 of the planetary reduction gear 4 is the shortest distance L2.

(iii) The shortest distance L1 is shorter than the shortest distance L2 (L1<L2).

As shown in FIG. 19, in the power transmission device 1A according to Modification 1, the discharge port 85b of the oil pump 85 is connected to oil holes Ha, Hb, and Hc formed in an upper portion of the main body box 10 via a pipe (not shown). The oil hole Ha is formed above the planetary reduction gear 4 of the support wall portion 146 of the fourth box 14. The oil hole Hb is formed between the coil end 253b of the second box 12A and the park lock mechanism PL. The oil hole Hc is formed above the connection wall 136 in the third box 13A.

Functions of the power transmission device 1A having such a configuration will be described.

As shown in FIG. 19, a part of the oil OL that flows into the oil catch portion 15 is discharged from the guide portion 154 to the oil passage 126a. The oil OL flowing through the oil passage 126 a is discharged from the oil passages 170 and 171.

As shown in FIG. 19, the oil OL discharged from the oil passages 170 and 171 is in contact with the coil ends 253a and 253b of the coil 253, which is a heat source, respectively. The oil OL in contact with the coil ends 253a and 253b moves downward in the vertical line VL direction due to its own weight while traveling along the coil ends 253a and 253b.

In this process, the heat exchange between the oil OL and the coil ends 253a and 253b cools the coil ends 253a and 253b while warming the oil OL.

As a result, the oil OL warmed by the heat exchange is reserved in a lower portion of the motor chamber Sa.

As shown in FIG. 19, when the oil pump 85 is driven, the suction force of the oil pump 85 causes the oil OL to flow toward the gear chamber Sb side in the main body box 10.

Specifically, as shown in FIG. 20, of the oil OL reserved in the motor chamber Sa, a part of the oil OL positioned on the coil end 253a side is discharged from the space Sc below the motor chamber Sa through the communication hole 112a. After passing through the communication hole 112a, the oil OL flows into the oil reservoir portion 128 and then moves toward the second gear chamber Sb2.

A part of the oil OL on the coil end 253b side moves to the second gear chamber Sb2 through the opening 120b.

As shown in FIG. 20, the open end 82a of the suction portion 82 of the strainer 80 is positioned below the second gear chamber Sb2. The oil OL warmed by the heat exchange with the coil ends 253a and 253b flows from the open end 82a of the suction portion 82 into the strainer 80 due to the suction force of the oil pump 85. The oil OL that flows into the strainer 80 is sucked into the oil pump 85.

Therefore, the oil pump 85 is warmed by the heat exchange with the coil ends 253a and 253b and can suck the oil OL with reduced viscosity from the suction portion 82 of the strainer 80.

As a result, the oil pump 85 can reduce the suction of the oil OL that becomes highly viscous or sherbet-like in a low-temperature environment. Therefore, the decrease in the amount of the oil OL discharged by the oil pump 85 can be reduced.

As shown in FIG. 19, the oil OL sucked by the oil pump 85 is supplied to the oil holes Ha, Hb, and Hc inside the main body box 10 via pipes (not shown). The oil OL supplied to the oil hole Ha lubricates the planetary reduction gear 4 in the fourth box 14 and around the differential case 50. The oil OL supplied to the oil hole Hb lubricates the bearing B1 and the park lock mechanism PL. The oil OL supplied to the oil hole Hc travels along the connection wall 136 and lubricates the bearing B1.

Here, as shown in FIG. 20, in the power transmission device 1A according to Modification 1, the shortest distance L1 from the open end 82a of the suction portion 82 to the outer peripheral surface 253b1 of the coil end 253b is set to be shorter than the shortest distance L2 from the open end 82a of the suction portion 82 to the outer peripheral surface 431a of the large-diameter gear portion 431 of the planetary reduction gear 4 (L1<L2).

As a result, the open end 82a of the suction portion 82 is brought closer to the coil end 253b, which is a heat source, and is kept away from the gear mechanism 3. Therefore, the influence when the oil pump 85 takes in the warmed oil OL and the oil level drops due to the rotation of the differential case 50 during normal operation (for example, air sucking by the electric oil pump 85) can be reduced.

In the present embodiment and Modification 1, the open end 82a of the strainer 80 is disposed below the second gear chamber Sb2, but the disposition of the strainer 80 is not limited only to this aspect.

Any position is acceptable as long as the shortest distance among the distances from the open end 82a of the suction portion 82 to the surface 253S of the coil 253 is shorter than the shortest distance among the distances from the open end 82a of the suction portion 82 to the surface 3S of the gear mechanism 3. For example, Modifications 2 to 5 may be adopted.

Note that in the following description, portions different from the power transmission device 1A will be described, and the same portions will be described denoted with the same reference numerals.

Modification 2

Figure 21:
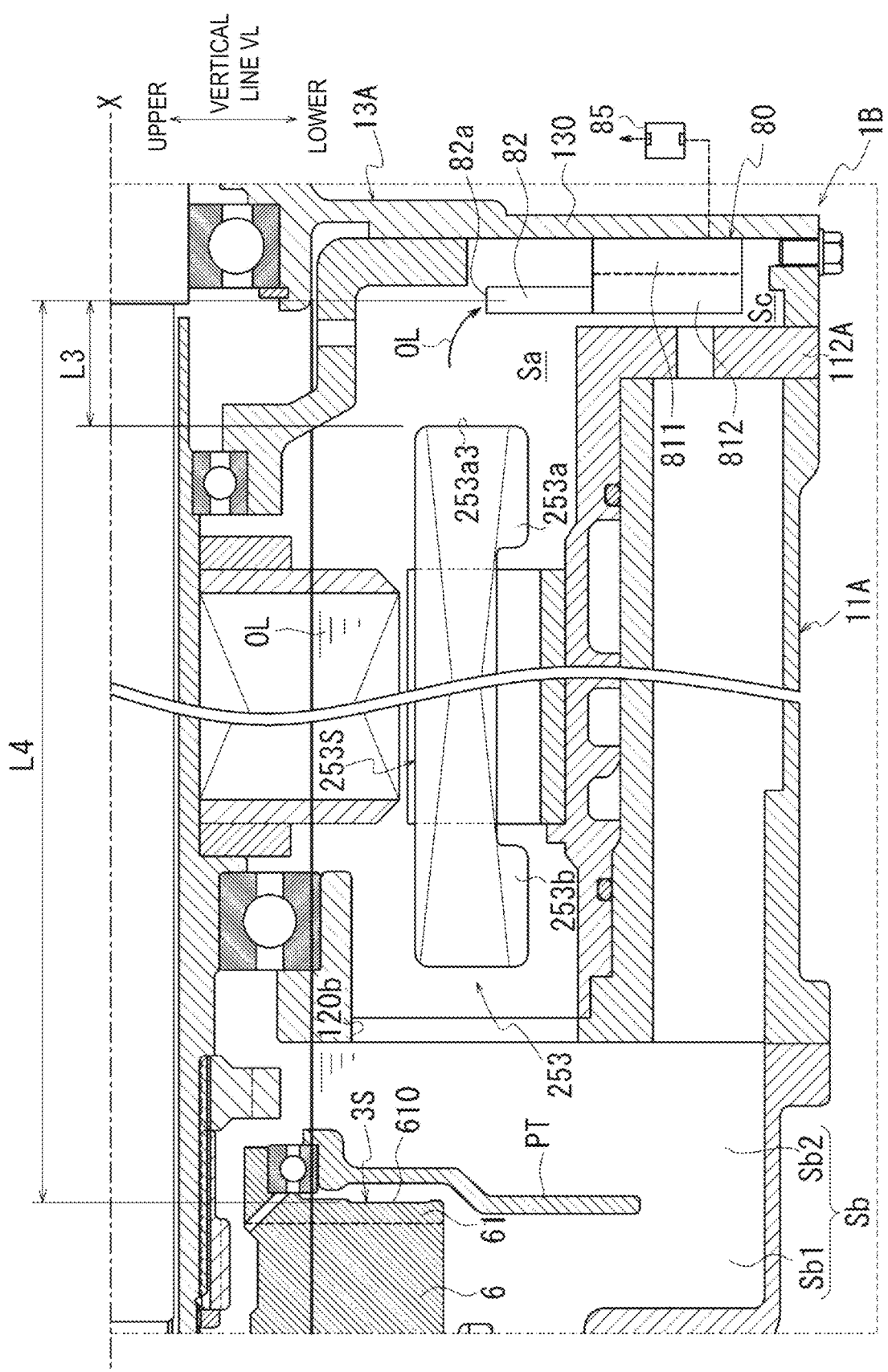
FIG. 21 is a diagram illustrating a power transmission device according to Modification 2.

FIG. 21 is a diagram illustrating a power transmission device 1B according to Modification 2. In FIG. 21, for convenience of explanation, a part of the power transmission device 1B is omitted to shorten the length in the rotation axis X direction.

As shown in FIG. 21, in the power transmission device 1B according to Modification 2, the strainer 80 is disposed in the above-described space Sc.

The strainer 80 is disposed inside the space Sc with an overlapping direction of the upper case 811 and the lower case 812 aligned with the rotation axis X.

The strainer 80 is oriented such that the upper case 811 is positioned on the wall portion 130 side of the third box 13A and the lower case 812 is positioned on the flange-like joint portion 112A side of the first box 11A.

The strainer 80 is fixed to the third box 13A by a fixture (not shown).

The strainer 80 is provided with the suction portion 82 directed upward in the vertical line VL direction. The open end 82a of the suction portion 82 is positioned within the motor chamber Sa. When viewed from the rotation axis X direction, the strainer 80 is provided with a positional relation in which the open end 82a of the suction portion 82 and the coil end 253a overlap each other.

In this state, the open end 82a of the suction portion 82 is disposed at a position that satisfies the following conditions.
(i) Among distances (linear distances) connecting the open end 82a and the surface 253S of the coil 253, a distance connecting the open end 82a and the end surface 253a3 of the coil end 253a is the shortest distance L3.
(ii) Among distances (linear distances) connecting the open end 82a and the surface 3S of the gear mechanism 3, a distance connecting the open end 82a and the side surface 610 of the base portion 61 of the first case portion 6 is the shortest distance L4.
(iii) The shortest distance L3 is shorter than the shortest distance L4 (L3<L4).

When the oil pump 85 is driven, the suction force of the oil pump 85 causes the oil OL to flow toward the strainer 80 in the motor chamber Sa.

Specifically, as shown in FIG. 21, a part of the oil OL reserved in the motor chamber Sa moves toward the open end 82a side of the suction portion 82 (in the arrow direction in the drawing).

Here, the oil OL that is sucked and moves toward the strainer 80 side is the oil OL that is warmed by the heat exchange with the coil end 253a, which is a heat source.

Therefore, the oil pump 85 can suck the oil OL that is warmed by the heat exchange with the coil end 253a and whose viscosity is decreased, from the suction portion 82 of the strainer 80.

As a result, the oil pump 85 can reduce the suction of the oil OL that becomes highly viscous or sherbet-like in a low-temperature environment, and the decrease in the amount of the oil OL discharged by the oil pump 85 can be reduced.

In the power transmission device 1B according to Modification 2, the shortest distance L3 from the open end 82a of the suction portion 82 to the end surface 253a3 of the coil end 253a is set to be shorter than the shortest distance L4 from the open end 82a of the suction portion 82 to the side surface 610 of the base portion 61 of the first case portion 6 (L3<L4).

As a result, the open end 82a of the suction portion 82 is brought closer to the coil end 253a, which is a heat source, and is kept away from the gear mechanism 3. Therefore, the influence when the oil pump 85 takes in the warmed oil OL and the oil level drops due to the rotation of the differential case 50 during normal operation (for example, air sucking by the electric oil pump 85) can be reduced.

Modification 3

Figure 22:
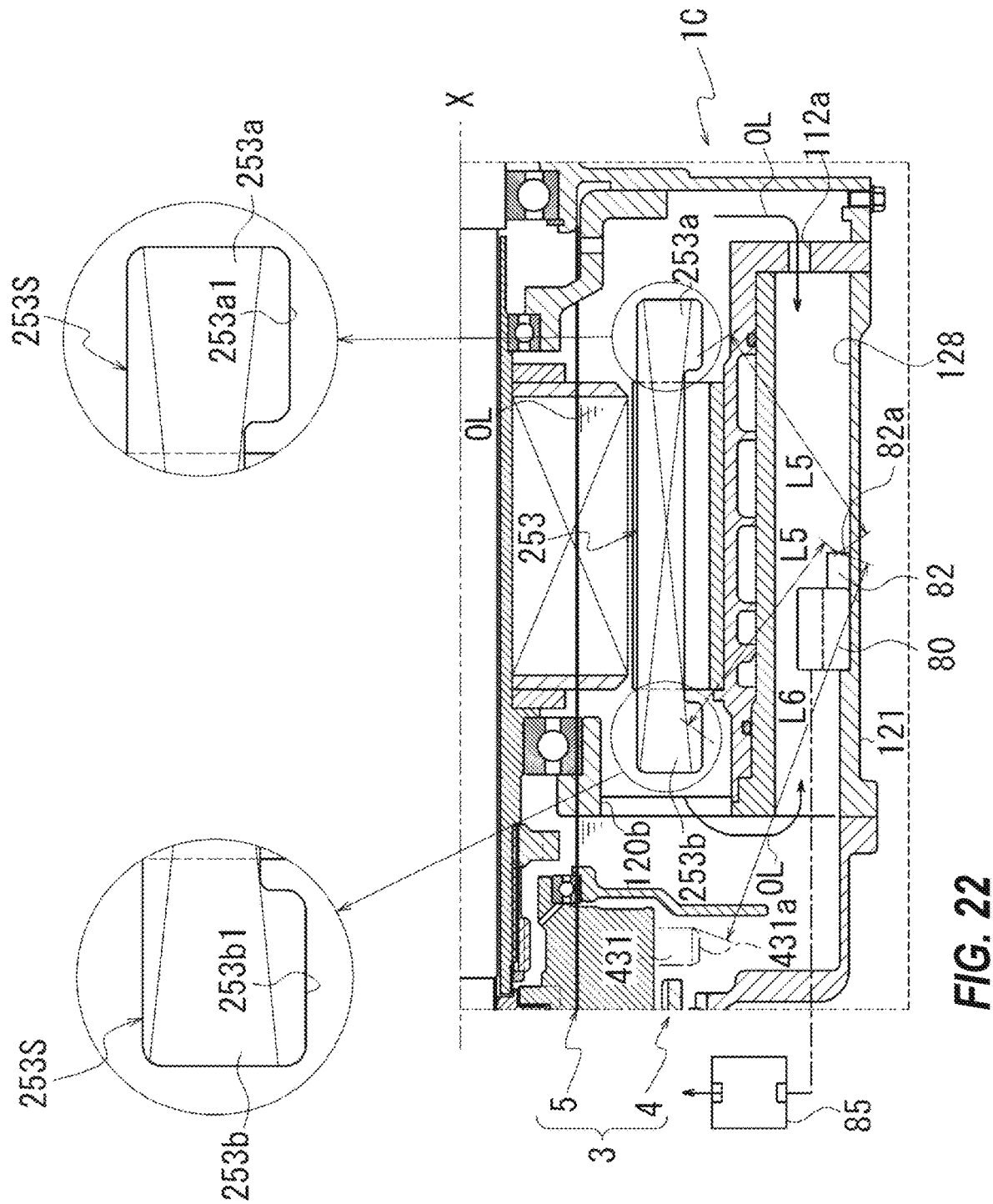
FIG. 22 is a diagram illustrating a power transmission device according to Modification 3.

FIG. 22 is a diagram illustrating a power transmission device 1C according to Modification 3.

In FIG. 22, a position of the large-diameter gear portion 431, which revolves while rotating around the rotation axis X when the differential case 50 rotates, passing through the lowermost region is indicated by a virtual line.

As shown in FIG. 22, in the power transmission device 1C according to Modification 3, the strainer 80 is disposed inside the oil reservoir portion 128. The strainer 80 is fixed to the peripheral wall portion 121 within the oil reservoir portion 128 by a fixture (not shown). The suction portion 82 of the strainer 80 is disposed at a position overlapping the coil 253 in the radial direction of the rotation axis X.

In this state, the open end 82a of the suction portion 82 is disposed at a position that satisfies the following conditions.
(i) Among distances (linear distances) connecting the open end 82a and the surface 253S of the coil 253, a distance connecting the open end 82a and the outer peripheral surface 253a1 of the coil end 253a and a distance connecting the open end 82a and the outer peripheral surface 253b1 of the coil end 253b are the shortest distances L5 and L5.
(ii) Among distances (linear distances) connecting the open end 82a and the surface 3S of the gear mechanism 3, a distance connecting the open end 82a and the outer peripheral surface 431a of the large-diameter gear portion 431 of the planetary reduction gear 4 is the shortest distance L6.
(iii) The shortest distance L5 is shorter than the shortest distance L6 (L5<L6).

When the oil pump 85 is driven, the suction force of the oil pump 85 causes the oil OL inside the motor chamber Sa to flow toward the oil reservoir portion 128.

Specifically, of the oil OL reserved in the motor chamber Sa, the oil OL on the coil end 253a side moves to the oil reservoir portion 128 through the communication hole 112a. The oil OL on the coil end 253b side moves from the opening 120b to the oil reservoir portion 128 via the gear chamber Sb.

Here, the oil OL sucked from the motor chamber Sa toward the oil reservoir portion 128 side is the oil OL warmed by the heat exchange with the coil ends 253a and 253b, which are heat sources.

Therefore, the oil pump 85 can suck the oil OL that is warmed by the heat exchange with the coil end 253a and whose viscosity is decreased, from the suction portion 82 of the strainer 80.

As a result, the oil pump 85 can reduce the suction of the oil OL that becomes highly viscous or sherbet-like in a low-temperature environment, and the decrease in the amount of the oil OL discharged by the oil pump 85 can be reduced.

In the power transmission device 1C according to Modification 3, the shortest distance L5 from the open end 82a of the suction portion 82 to the outer peripheral surface 253a1 of the coil end 253a, and the shortest distance L5 from the open end 82a of the suction portion 82 to the outer peripheral surface 253b1 of the coil end 253b are set to be shorter than the shortest distance L6 from the open end 82a of the suction portion 82 to the outer peripheral surface 431a of the large-diameter gear portion 431 of the planetary reduction gear 4 (L5<L6).

As a result, the open end 82a of the suction portion 82 is brought closer to the coil ends 253a and 253b, which is a heat source, and is kept away from the gear mechanism 3. Therefore, the influence when the oil pump 85 takes in the warmed oil OL and the oil level drops due to the rotation of the differential case 50 during normal operation (for example, air sucking by the electric oil pump 85) can be reduced.

Modification 4

Figure 23:
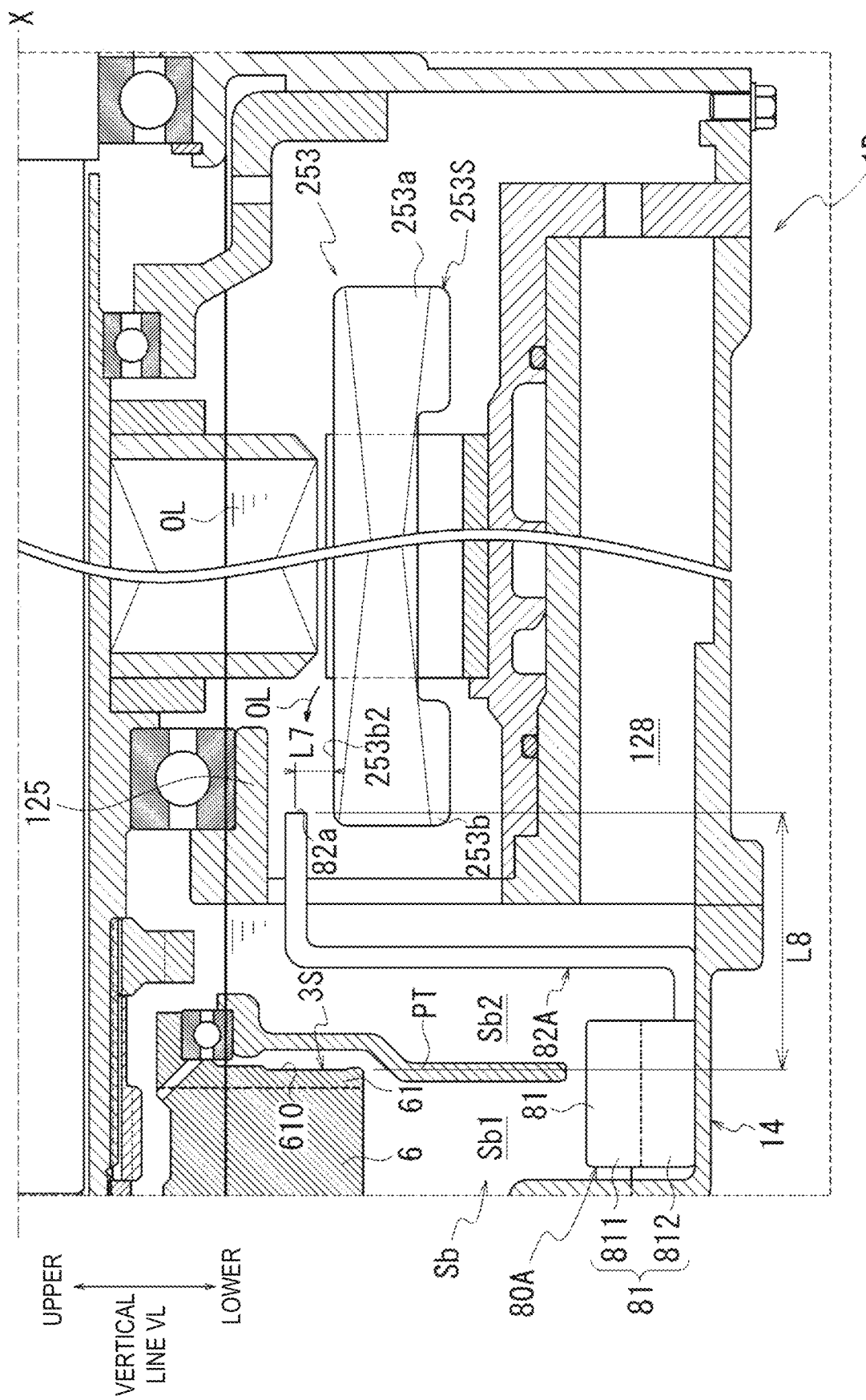
FIG. 23 is a diagram illustrating a power transmission device according to Modification 4.

FIG. 23 is a diagram illustrating a power transmission device 1D according to Modification 4.

In FIG. 23, for convenience of explanation, a part of the power transmission device 1D is omitted to shorten the length in the rotation axis X direction.

As shown in FIG. 23, in the power transmission device 1D according to Modification 4, a strainer 80A is disposed below the plate member PT inside the gear chamber Sb.

The strainer 80A is fixed to the fourth box 14 by a fixture (not shown) such that a direction in which the upper case 811 and the lower case 812 overlap each other is orthogonal to the rotation axis X.

A suction portion 82A is a tubular member, and has a length that allows the open end 82a side (tip side) to be inserted between the coil end 253b and the motor support portion 125.

The suction portion 82A is bent upward on the rotation axis X side from a position offset from the lower case 812 toward the motor 2 side. The suction portion 82A extends linearly with the second box 12 side of the plate member PT directed upward toward the rotation axis X side, and then bent toward the motor 2 side. The open end 82a of the suction portion 82A is inserted between the inner peripheral surface 253b2 of the coil end 253b and the motor support portion 125.

In this state, the open end 82a of the suction portion 82A is disposed at a position that satisfies the following conditions.
(i) Among distances (linear distances) connecting the open end 82a and the surface 253S of the coil 253, a distance connecting the open end 82a and the inner peripheral surface 253b2 of the coil end 253b is the shortest distance L7.
(ii) Among distances (linear distances) connecting the open end 82a and the surface 3S of the gear mechanism 3, a distance connecting the open end 82a and the side surface 610 of the base portion 61 of the first case portion 6 is the shortest distance L8.
(iii) The shortest distance L7 is shorter than the shortest distance L8 (L7<L8).

When the oil pump 85 is driven, the suction force of the oil pump 85 causes the oil OL inside the motor chamber Sa to flow toward the open end 82a.

Specifically, of the oil OL reserved in the motor chamber Sa, the oil OL on the coil end 253b side flows from the open end 82a of the suction portion 82A into the strainer 80A, and then is sucked by the oil pump 85.

Here, the oil OL that is sucked and moves toward the strainer 80A side is the oil OL that is warmed by the heat exchange with the coil end 253b, which is a heat source.

Therefore, the oil pump 85 can suck the oil OL that is warmed by the heat exchange with the coil end 253b and whose viscosity is decreased, from the suction portion 82A of the strainer 80A.

As a result, the oil pump 85 can reduce the suction of the oil OL that becomes highly viscous or sherbet-like in a low-temperature environment, and the decrease in the amount of the oil OL discharged by the oil pump 85 can be reduced.

In the power transmission device 1D according to Modification 4, the shortest distance L7 from the open end 82a of the suction portion 82A to the inner peripheral surface 253a2 of the coil end 253a is set to be shorter than the shortest distance L8 from the open end 82a of the suction portion 82 to the side surface 610 of the base portion 61 of the first case portion 6 (L7 <L8).

As a result, the open end 82a of the suction portion 82A is brought closer to the coil end 253b, which is a heat source, and is kept away from the gear mechanism 3. Therefore, the influence when the oil pump 85 takes in the warmed oil OL and the oil level drops due to the rotation of the differential case 50 during normal operation (for example, air sucking by the electric oil pump 85) can be reduced.

Modification 5

Figure 24:
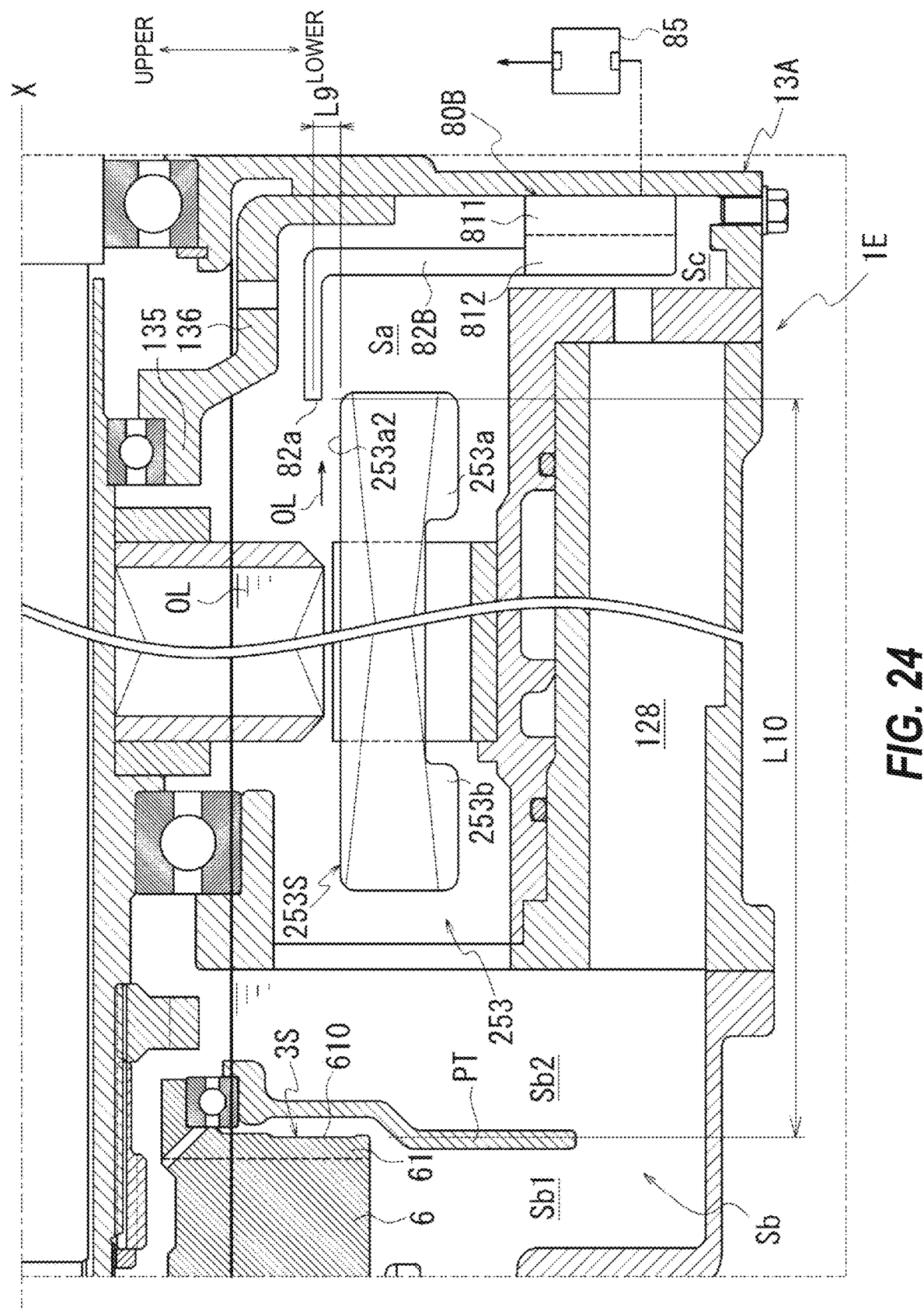
FIG. 24 is a diagram illustrating a power transmission device according to Modification 5.

FIG. 24 is a diagram illustrating a power transmission device 1E according to Modification 5. In FIG. 24, for convenience of explanation, a part of the power transmission device 1E is omitted to shorten the length in the rotation axis X direction.

As shown in FIG. 24, in the power transmission device 1E according to Modification 5, a strainer 80B is accommodated in the space Sc in the motor chamber Sa. The strainer 80B is disposed in the space Sc such that a direction in which the upper case 811 and the lower case 812 overlap each other is aligned with the rotation axis X, and is fixed to the third box 13A by a fixture (not shown).

A suction portion 82B is a tubular member, and has a length that allows the open end 82a side (tip side) to be inserted between the coil end 253a and the motor support portion 135.

The suction portion 82B extends upward in the vertical line VL direction from the lower case 812 in the motor chamber Sa and is bent toward the motor 2 side. The open end 82a of the suction portion 82B is inserted between the inner peripheral surface 253a2 of the coil end 253b and the motor support portion 135.

In this state, the open end 82a of the suction portion 82B is disposed at a position that satisfies the following conditions.
(i) Among distances (linear distances) connecting the open end 82a and the surface 253S of the coil 253, a distance connecting the open end 82a and the inner peripheral surface 253a2 of the coil end 253a is the shortest distance L9.
(ii) Among distances (linear distances) connecting the open end 82a and the surface 3S of the gear mechanism 3, a distance connecting the open end 82a and the side surface 610 of the base portion 61 of the first case portion 6 is the shortest distance L10.
(iii) The shortest distance L9 is shorter than the shortest distance L10 (L9<L10).

When the oil pump 85 is driven, the suction force of the oil pump 85 causes the oil OL inside the motor chamber Sa to flow toward the open end 82a.

Specifically, of the oil OL reserved in the motor chamber Sa, the oil OL on the coil end 253b side flows from the open end 82a of the suction portion 82A into the strainer 80A, and then is sucked by the oil pump 85.

Here, the oil OL that is sucked and moves toward the strainer 80B side is the oil OL that is warmed by the heat exchange with the coil end 253a, which is a heat source.

Therefore, the oil pump 85 can suck the oil OL that is warmed by the heat exchange with the coil end 253a and whose viscosity is decreased, from the suction portion 82a of the strainer 80B.

As a result, the oil pump 85 can reduce the suction of the oil OL that becomes highly viscous or sherbet-like in a low-temperature environment, and the decrease in the amount of the oil OL discharged by the oil pump 85 can be reduced.

In the power transmission device 1E according to Modification 5, the shortest distance L9 from the open end 82a of the suction portion 82B to the inner peripheral surface 253a2 of the coil end 253a is set to be shorter than the shortest distance L10 from the open end 82a of the suction portion 82 to the side surface 610 of the base portion 61 of the first case portion 6 (L9 <L10).

As a result, the open end 82a of the suction portion 82B is brought closer to the coil end 253a, which is a heat source, and is kept away from the gear mechanism 3. Therefore, the influence when the oil pump 85 takes in the warmed oil OL and the oil level drops due to the rotation of the differential case 50 during normal operation (for example, air sucking by the electric oil pump 85) can be reduced.

Modification 6

Figure 25:
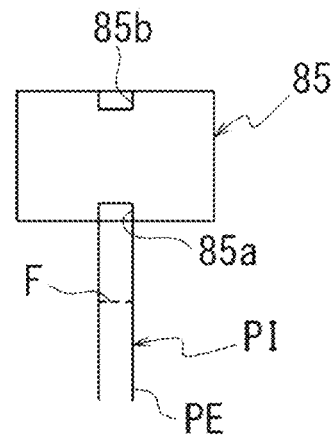
FIG. 25 is a diagram showing a configuration example of an oil pump according to Modification 6.
Figure 26:
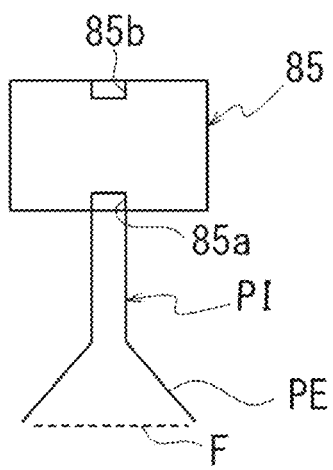
FIG. 26 is a diagram showing a configuration example of the oil pump according to Modification 6.
Figure 27:
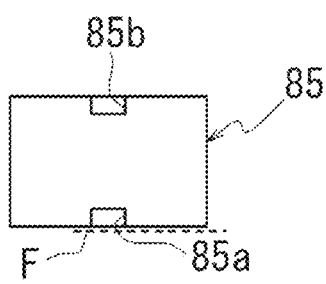
FIG. 27 is a diagram showing a configuration example of the oil pump according to Modification 6.

FIGS. 25 to 27 are diagrams showing a configuration example of the oil pump 85 according to Modification 6.

In the present embodiment and Modifications 1 to 5, in the power transmission device 1, an example in which the mechanism for filtering and circulating the oil OL is constituted by the oil pump 85 and the strainer 80, is described (see FIG. 18). However, the circulation mechanism for the oil OL is not limited to the examples of the present embodiment and Modifications 1 to 5, and may be configured without the strainer 80, for example.

As shown in FIG. 25, when the strainer is omitted, the filter F for filtering impurities may be disposed inside the pipe PI connected to the suction port 85a of the oil pump 85. In the case of FIG. 25, when the oil pump 85 is driven, the oil OL is sucked from the end portion PE of the pipe PI, passes through the filter F, and is sucked into the suction port 85a of the oil pump 85. That is, the end portion PE of the pipe PI corresponds to the "pump inlet".

FIG. 26 also shows an example in which the end portion PE of the pipe PI corresponds to the "pump inlet" as in FIG. 25, but in FIG. 26, the end portion PE of the pipe PI is expanded in diameter, and the filter F is disposed at the end portion PE. By configuring as shown in FIG. 26, the size of the filter F can be increased.

In the case of the configurations shown in FIGS. 25 and 26, both the oil pump 85 and the pipe PI may be disposed inside the main body box 10 (see FIG. 2). Alternatively, the oil pump 85 may be disposed outside the main body box 10 and a part of the pipe PI may be disposed inside the main body box 10. In this case, it is preferable to dispose at least the end portion PE of the pipe PI near the coil end 253a or the coil end 253b.

FIG. 27 shows an example in which the pipe is also omitted, and the filter F is disposed directly at the suction port 85a of the oil pump 85. In this case, the suction port 85a corresponds to the "pump inlet".

In the case of the configuration shown in FIG. 27, the oil pump 85 may be disposed near the coil end 253a or the coil end 253b in the main body box 10, and the suction port 85a is positioned facing the surface 253a4 of the coil end 253a or the surface 253b4 of the coil end 253b.

Other Modifications

Although an example using an electric oil pump as the oil pump 85 is described in the embodiment, a mechanical oil pump may be used. For example, the mechanical oil pump may be disposed in the motor chamber Sa of the main body box 10 and driven using the rotation of the motor 2.

The "gear mechanism" is an entire mechanism including gears. For example, in the case of the present embodiment, the gear mechanism 3 includes the planetary reduction gear 4 and the differential mechanism 5 (differential gear).

The "distance between the pump inlet and the stator of the motor" means the shortest distance between the open end portion of the pump inlet and the surface of the stator. For example, as shown in the present embodiment, it means the linear distance L1 between the open end 82a of the suction portion 82 of the strainer 80 and the outer peripheral surface 253b1 of the coil end 253b of the coil 253 included in the stator core 25.

The "distance between the pump inlet and the gear mechanism" means the shortest distance between the open end portion of the pump inlet and the surface of the gear constituting the gear mechanism. For example, as shown in the present embodiment, when the gear mechanism 3 is constituted by a plurality of gears (the planetary reduction gear 4 and the differential mechanism 5), it means the linear distance L2 between the outer peripheral surface 431a of the large-diameter gear portion 431 of the planetary reduction gear 4, which is the gear closer to the open end 82a of the suction portion 82 and the open end 82a of the suction portion 82.

In the present embodiment and Modifications 1 to 5, the "outer peripheral surface 431a of the large-diameter gear portion 431 in the planetary reduction gear 4" and the "end surface 610 of the base portion 61 of the first case portion 6 in the differential mechanism 5" are exemplified as the "surface of the gear mechanism", but the present invention is not limited thereto. For example, the side surface of the large-diameter gear portion 431, the outer peripheral surface of the connecting beam 62 of the first case portion 6, and the like are also included in the "surface 3S of the gear mechanism 3".

Although the surface 253S of the coil 253 serving as a heat source is exemplified as the "surface of the stator", but the present invention is not limited thereto. For example, the surface of the yoke portion 251 and the teeth portion 252 that constitute the stator core 25 may be included. This is because the heat of the coil 253 is also transmitted to the yoke portion 251 and the teeth portion 252, and can be considered as one heat source.

The "distance between the pump inlet and the outlet" means the shortest distance between the open end portion of the pump inlet and the open end portion of the outlet. For example, as shown in the present embodiment, it means the linear distance L20 between the open end 82a of the suction portion 82 and a lower end of the oil passage 181.

Note that the "distance between the pump inlet and the outlet" in the case where "there are a plurality of outlets" means the shortest distance between the pump inlet and the outlet closest to the open end of the pump inlet. For example, as shown in the present embodiment, when there are oil passages 180 and 181, it means the linear distance between the lower end of the communication hole 181 closest to the suction portion 82 and the open end portion 82a of the suction portion 82.

Here, in the present embodiment and Modifications 1 to 5 described above, the strainer 80 is provided with one suction portion 82 as a pump inlet, but the present invention is not limited to this aspect. The strainer 80 may include a plurality of suction portions 82 as the pump inlet.

In this case, the "distance between the pump inlet and the stator of the motor" means the shortest distance between the surface of the stator core 25 and the suction portion 82 closest to the surface of the counterpart (the stator core 25). The "distance between the pump inlet and the gear mechanism" means the shortest distance between the surface of the gear mechanism 3 and the suction portion 82 closest to the surface of the counterpart (the gear mechanism 3). The "distance between the pump inlet and the outlet" means the shortest distance between the open end portion of the oil passage 181 and the suction portion 82 closest to the counterpart (the open end portion of the outlet (for example, the oil passage 181)).

The "pump inlet" is in contact with the reserved oil, that is, is immersed in the reserved oil and is connected to the suction port 85a of the oil pump 85.

For example, as shown in the present embodiment, when the strainer 80 is connected to the suction port 85a of the oil pump 85, the suction portion 82 of the strainer 80 corresponds to the pump inlet.

Further, for example, as shown in Modification 6, when the suction port 85a of the oil pump 85 is in direct contact with (immersed in) the reserved oil, the suction port 85a of the oil pump 85 corresponds to the pump inlet.

Although a power transmission device (power train device (transmission, speed reducer, or the like)) of an electric vehicle EV equipped with a motor is exemplified in the present embodiment, the present invention is not limited thereto. The present invention can be applied to anything other than an electric vehicle as long as it includes a motor.

Here, "connected downstream" means a connection relation in which power is transmitted from a component disposed upstream to a component positioned downstream. For example, the "planetary reduction gear 4 connected downstream of the motor 2" means that power is transmitted from the motor 2 to the planetary reduction gear 4. Note that, for example, the gear mechanism 3 may be connected downstream of the motor 2 via a transmission mechanism, a clutch, or the like. In this case, the connection relation is such that the power of the motor 2 is transmitted to the gear mechanism 3 via the transmission mechanism, the clutch, or the like. The transmission mechanism is a mechanism having a transmission function, and includes, for example, a stepped transmission mechanism and a continuously variable transmission mechanism.

Although the embodiment of the present invention has been described above, the above embodiment merely exemplifies one application example of the present invention, and does not intend to limit the technical scope of the present invention to the specific configuration of the above embodiment. It can be changed as appropriate within the scope of the technical idea of the invention.

REFERENCE SIGNS LIST 1, 1A to 1E: power transmission device
2: motor
3: gear mechanism
4: planetary reduction gear
21: rotor core (rotor)
25: stator core (stator)
80: strainer
82: suction portion (pump inlet)
85: oil pump (pump)
3S: surface
82a: open end
253a, 253b: coil end
253S: surface
253a4: surface
253b4: surface
L1 to L10: shortest distance
180, 181: communication hole (outlet)
DA: drive shaft (drive shaft)
K: accommodation chamber
OL: oil VL: vertical line
X: rotation axis

The invention claimed is:

1. A power transmission device, comprising:
a motor;
a gear mechanism connected downstream of the motor;
a strainer including a main body portion and a strainer inlet connected to the main body portion; and
a pump that sucks oil through the strainer inlet, wherein
the main body portion is offset with respect to the motor when viewed from a radial direction, the main body portion is disposed on a gear mechanism side and a shortest distance between an open end of the strainer inlet and a surface of a stator of the motor is shorter than a shortest distance between the open end of the strainer inlet and a surface of the gear mechanism.

2. The power transmission device according to claim 1, further comprising:
an accommodation chamber that accommodates at least a part of the stator, wherein
oil discharged through an outlet of the accommodation chamber is introduced into the strainer inlet.

3. The power transmission device according to claim 2, wherein
the strainer inlet opens toward an outlet side.

4. The power transmission device according to claim 2, wherein
the accommodation chamber is separated from a rotor of the motor.

5. The power transmission device according to claim 2, wherein
the accommodation chamber has a shape that encloses a coil end of the stator of the motor.

6. The power transmission device according to claim 5, wherein
the accommodation chamber has a shape including an arcuate portion that encloses the coil end of the stator of the motor.

7. The power transmission device according to claim 2, wherein
the outlet opens downward.

8. The power transmission device according to claim 1, wherein
the strainer inlet is constituted as a suction port of the strainer.

9. The power transmission device according to claim 1, further comprising:
a drive shaft connected downstream of the gear mechanism and disposed passing through an inner periphery of the motor.

10. The power transmission device according to claim 1, wherein
the gear mechanism includes a planetary reduction gear.

11. The power transmission device according to claim 1, wherein
the main body portion overlaps the gear mechanism when viewed from the radial direction.

12. The power transmission device according to claim 1, wherein
the main body portion is offset with respect to the gear mechanism when viewed from the radial direction.

13. A power transmission device, comprising:
a box having a motor chamber accommodating a motor;
a gear mechanism connected downstream of the motor;
a strainer including a main body portion and a pump inlet connected to the main body portion; and
a pump that sucks oil through the pump inlet; and
an accommodation chamber that is provided inside the motor chamber and accommodates at least a part of a stator, wherein
the main body portion is offset with respect to the motor when viewed from a radial direction, the main body portion is disposed on a gear mechanism side and oil discharged through an outlet of the accommodation chamber is introduced into the pump inlet.

14. The power transmission device according to claim 13, wherein
the pump inlet opens toward an outlet side.

15. The power transmission device according to claim 13, wherein
the accommodation chamber is separated from a rotor of the motor.

16. The power transmission device according to claim 13, wherein
the accommodation chamber has a shape that encloses a coil end of the stator of the motor.

17. The power transmission device according to claim 16, wherein
the accommodation chamber has a shape including an arcuate portion that encloses the coil end of the stator of the motor.

18. The power transmission device according to claim 13, wherein
the outlet opens downward.

19. The power transmission device according to claim 13, wherein
the pump inlet is constituted as a suction port of the strainer.

20. The power transmission device according to claim 13, further comprising:
a drive shaft connected downstream of the gear mechanism and disposed passing through an inner periphery of the motor.

21. The power transmission device according to claim 13, wherein
the gear mechanism includes a planetary reduction gear.

22. The power transmission device according to claim 13, wherein
the main body portion overlaps the gear mechanism when viewed from the radial direction.

23. The power transmission device according to claim 13, wherein
the main body portion is offset with respect to the gear mechanism when viewed from the radial direction.

24. A power transmission device, comprising:
a motor;
a gear mechanism connected downstream of the motor;
a strainer including a main body portion and a pump inlet connected to the main body portion, wherein the pump inlet opens toward an outlet side;
a pump that sucks oil through the pump inlet, wherein the main body portion is offset with respect to the motor when viewed from a radial direction, the main body portion is disposed on a gear mechanism side and a shortest distance between an open end of the pump inlet and a surface of a stator of the motor is shorter than a shortest distance between the open end of the pump inlet and a surface of the gear mechanism; and
an accommodation chamber that accommodates at least a part of the stator, wherein oil discharged through an outlet of the accommodation chamber is introduced into the pump inlet.

25. A power transmission device, comprising:
a motor;

a gear mechanism connected downstream of the motor;

a strainer including a main body portion and a pump inlet connected to the main body portion;

a pump that sucks oil through the pump inlet, wherein the main body portion is offset with respect to the motor when viewed from a radial direction, the main body portion is disposed on a gear mechanism side and a shortest distance between an open end of the pump inlet and a surface of a stator of the motor is shorter than a shortest distance between the open end of the pump inlet and a surface of the gear mechanism; and an accommodation chamber that accommodates at least a part of the stator, wherein oil discharged through an outlet of the accommodation chamber is introduced into the pump inlet, wherein the outlet opens downward.

* * * * *